US007530025B2

(12) United States Patent  
Ramarajan et al.

(10) Patent No.: US 7,530,025 B2  
(45) Date of Patent: May 5, 2009

(54) SYSTEMS AND METHODS FOR HANDLING TIME-STAMPED DATA

(75) Inventors: Rajiv Ramarajan, Durham, NC (US); Richard Patrick Fahey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 605 days.

(21) Appl. No.: 11/124,920

(22) Filed: May 9, 2005

(65) Prior Publication Data  
US 2006/0253790 A1 Nov. 9, 2006

(51) Int. Cl.  
G06F 3/048 (2006.01)  
G06F 3/00 (2006.01)  
G06F 13/00 (2006.01)  
G06T 11/20 (2006.01)  
G06Q 10/00 (2006.01)

(52) U.S. Cl. .......................... 715/764; 345/440; 705/1; 715/700; 725/38

(58) Field of Classification Search ......... 345/418–475; 705/1–45; 725/37–61; 715/700, 764  
See application file for complete search history.

(56) References Cited

U.S. PATENT DOCUMENTS 6,074,434 A * 6/2000 Cole et al. ................. 717/173
2002/0032696 A1 * 3/2002 Takiguchi et al. ......... 707/500.1
2002/0147670 A1 * 10/2002 Lange ......................... 705/35
2003/0158466 A1 * 8/2003 Lynn et al. .................. 600/300
2003/0200134 A1 * 10/2003 Leonard et al. .............. 705/10
2004/0027349 A1 * 2/2004 Landau et al. .............. 345/440
2004/0095266 A1 * 5/2004 Kernahan et al. ........... 341/165
2005/0091147 A1 * 4/2005 Ingargiola et al. ........... 705/37

FOREIGN PATENT DOCUMENTS

CA 2280595 A1 * 2/2001  
WO WO 0217125 A1 * 2/2002

OTHER PUBLICATIONS

Ken Slovak; Absolute Beginner's Guide to Microsoft® Office Outlook® 2003; Oct. 1, 2003; Que Publishing; Chapter 7.*

* cited by examiner

*Primary Examiner*—Xiao M Wu  
*Assistant Examiner*—David T Welch  
(74) *Attorney, Agent, or Firm*—Jones Day

(57) ABSTRACT

Systems and methods are provided for handling time-stamped data. The one or more GUIs are used to define properties of an event and to associate the event with time-stamped data. The properties of the event defined using the one or more GUIs includes one or more statistical properties that indicate how the event statistically affects the time-stamped data. A time series analysis program uses the time-stamped data and the associated event to generate a mathematical model.

26 Claims, 23 Drawing Sheets

Fig. 21

SYSTEMS AND METHODS FOR HANDLING TIME-STAMPED DATA

FIELD

The technology described in this patent document relates generally to the field of computer data modeling. More specifically, systems and methods are provided for handling time-stamped data using one or more graphical user interfaces.

BACKGROUND AND SUMMARY

The effects of events on time-stamped data may be an important factor in creating an accurate mathematical model of the data, for example to improve the predictive ability of the model. Examples of events that may affect time-stamped data include advertising campaigns, retail promotions, strikes, natural disasters, policy changes, a data recording error, etc. The characteristics of an event may define the effect that an occurrence has on the time-stamped data and the duration of the occurrence. An event may include a single occurrence (e.g., a worker strike), multiple occurrences (e.g., a holiday), or irregular occurrences (e.g., new store openings.) Further, an occurrence may be on a fixed date or a relative date (e.g., an event may begin two weeks before Christmas.) In addition, an event may be a combination of occurrences (e.g., a retail sale that occurs over a holiday.) Thus, modeling events so that they increase the accuracy of a time series model can often be complicated.

In accordance with the teachings described herein, systems and methods are provided for handling time-stamped data. The one or more GUIs may be used to define properties of an event and to associate the event with time-stamped data. The properties of the event defined using the one or more GUIs may include one or more statistical properties that indicate how the event statistically affects the time-stamped data. A time series analysis program may use the time-stamped data and the associated event to generate a mathematical model.

BRIEF DESCRIPTION OF THE DRAWINGS

Figure 21:
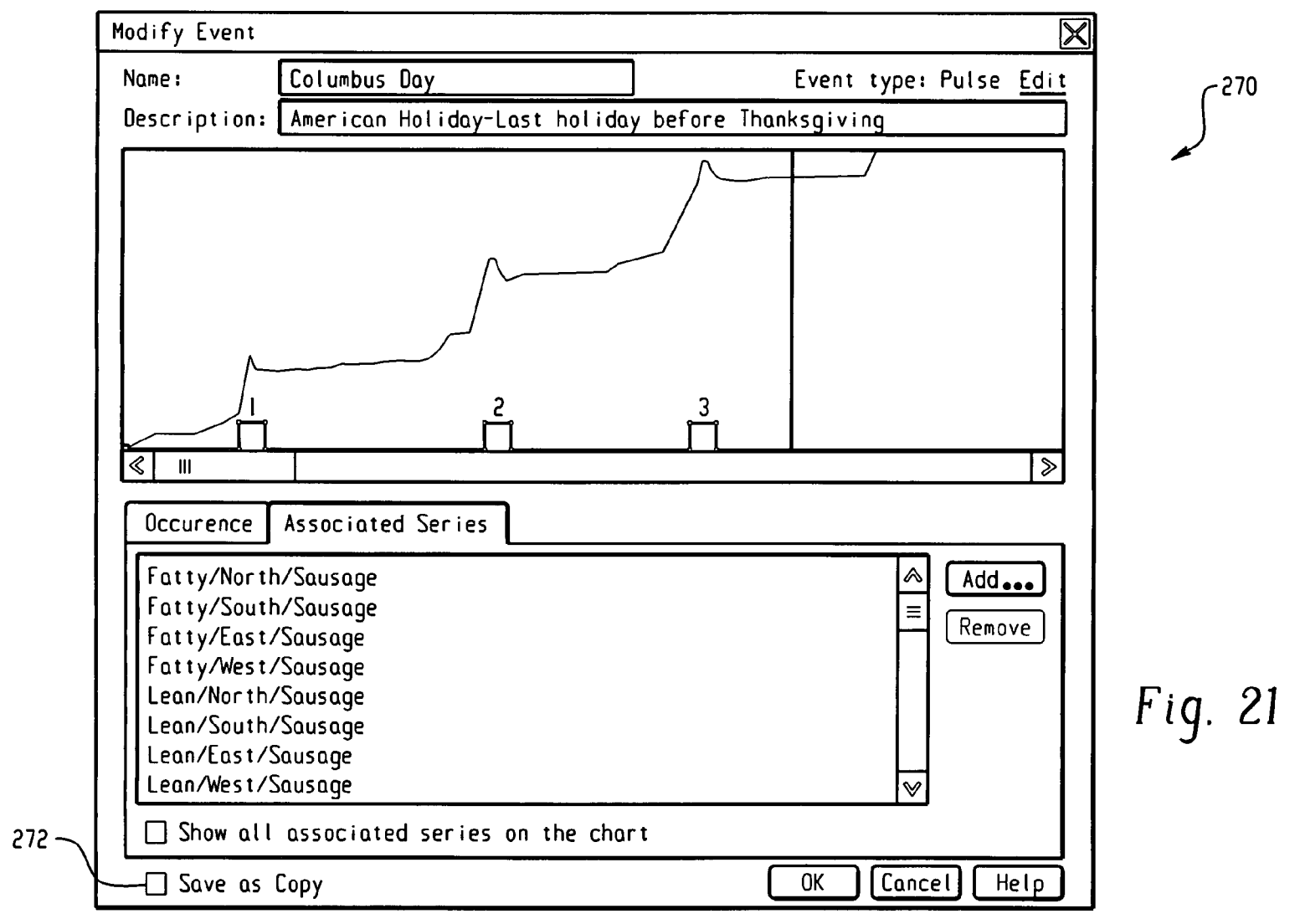

FIG. 21 depicts an example GUI for modifying properties of a stored time series event.

DETAILED DESCRIPTION

Figure 1:
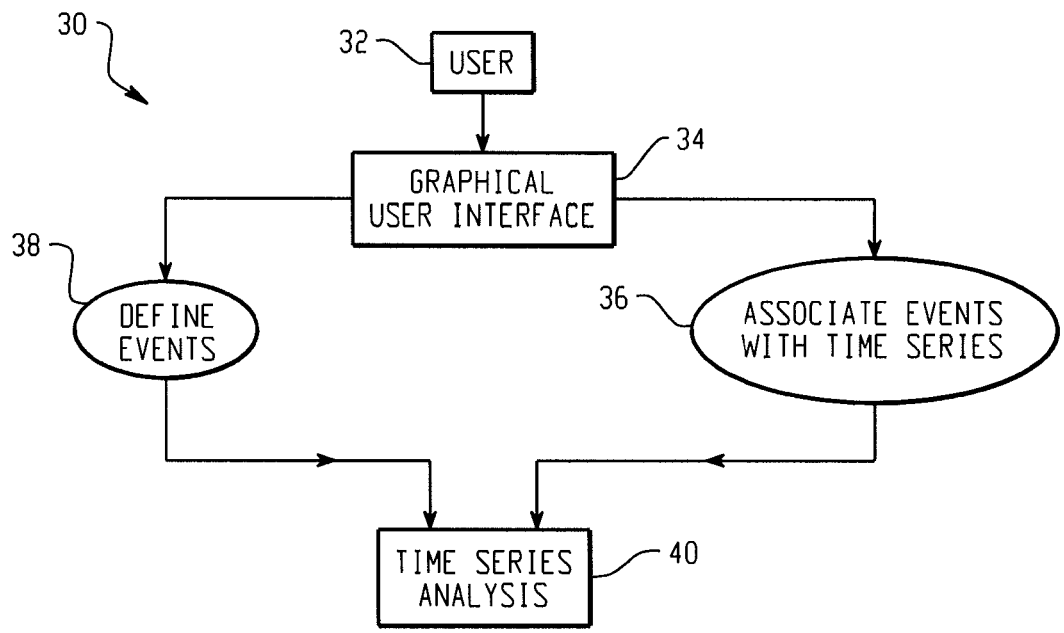
FIG. 1 is a block diagram depicting an example system for generating a mathematical model from time-stamped data.

FIG. 1 is a block diagram depicting an example system 30 for generating a mathematical model from time-stamped data. In the illustrated examples, the time-stamped data is stored in the form of a time series (referred to herein as time series data.) The system 30 includes software instructions for generating one or more graphical user interfaces (GUIs) 34 and also includes a time series analysis program 40. A user 32 may input instructions using the GUI 34 in order to define properties of events 38 and to associate the events with the stored time series data 36. The properties of the event can include one or more statistical properties of the event that indicate how the event statistically affects the stored time series data.

The time series analysis program 40 is configured to use the stored time series data and the associated event to generate the time series model. In one example, the time series analysis program 40 may be a forecasting program, such as described in the following commonly-owned patent applications, which are incorporated herein by reference: U.S. patent application Ser. No. 10/402,849, entitled "System and Method for Large-Scale Automatic Forecasting," filed Mar. 28, 2003; U.S. Provisional Patent Application No. 60/679,093, entitled "Computer-implemented forecasting systems and methods," filed on May 09, 2005; U.S. Provisional Patent Application No. 60/679,290, entitled "Computer-implemented variable selection systems and methods," filed on May 09, 2005; U.S. Provisional Patent Application No. 60/679,091, entitled "Computer-implemented forecasting scoring systems and methods," filed on May 09, 2005; and U.S. Provisional Patent Application No. 60/679,092, entitled "Computer-implemented forecasting language systems and methods." A forecasting program may, for example, use statistical properties associated with an event to predict how one or more future occurrences of the event will affect a forecast of the time series data. In other examples, however, a time series model generated by the time series analysis program 40 could be used for other functions, such as process control.

Although shown as a single block in FIG. 1, the GUI 34 may include more than one graphical user interface, such as one or more interface displays along with associated dialog windows, menus, and/or other types of graphical user interfaces. The GUI 34 may provide one or more regions to graphically display stored time series data and to define the properties of an event with reference to the displayed time series. Example GUI regions for defining the properties of an event may include a region for inputting an event type that defines the statistical properties of the event, a region to define a starting time and duration of the event, a region for defining a recurrence of the event, a region for naming the event, and/or other regions for defining relevant characteristics of the event. The GUI 34 may also provide one or more regions for associating the event with one or more time series, such as a region for selecting one or more stored time series from a list.

In addition, the GUI 34 may provide a display region for displaying time series data and for graphically defining the properties of an event in relation to the displayed time series data. For example, if time series data is displayed on a graph that shows the passage of time, then the duration of a displayed event may be graphically defined by selecting a beginning or ending edge of the event on the display and dragging the edge alone the time axis to expand or shorten the event's duration.

Figure 2:
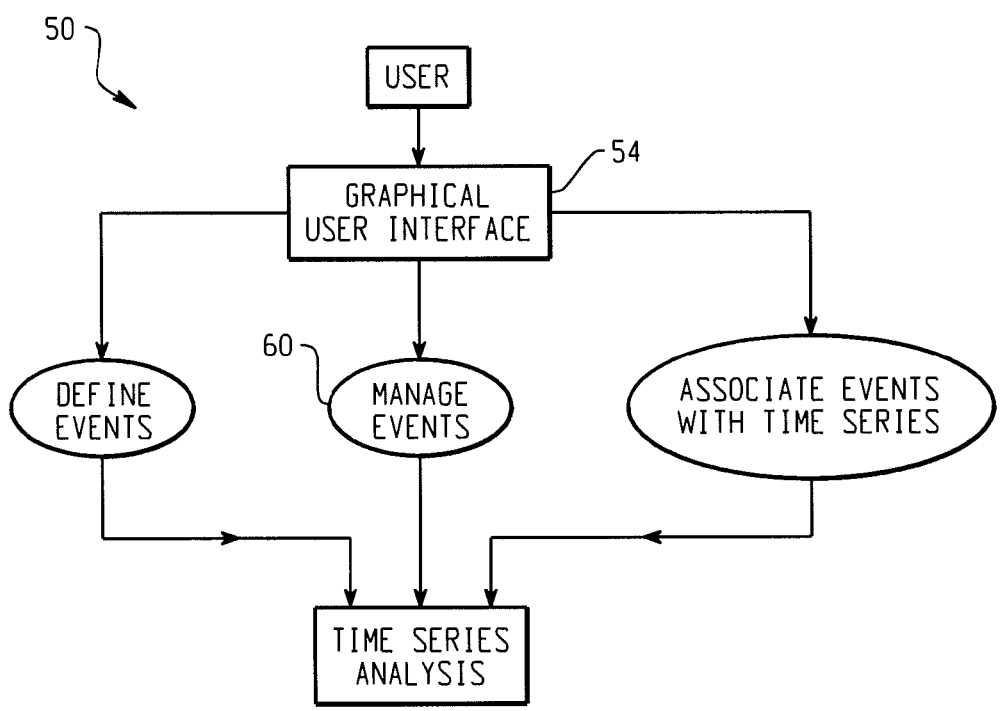
FIG. 2 is a block diagram depicting another example system for generating a mathematical model from time-stamped data.

FIG. 2 is a block diagram depicting another example system 50 for generating a mathematical model from time-stamped data. In this example, the GUI 54 may also be used to manage one or more events 60. For example, the GUI 54 may provide one or more regions for viewing a list of stored events, editing properties of the stored events, copying or deleting stored events, combining one or more stored events to generate a new event, and/or other event management functions.

Figure 3:
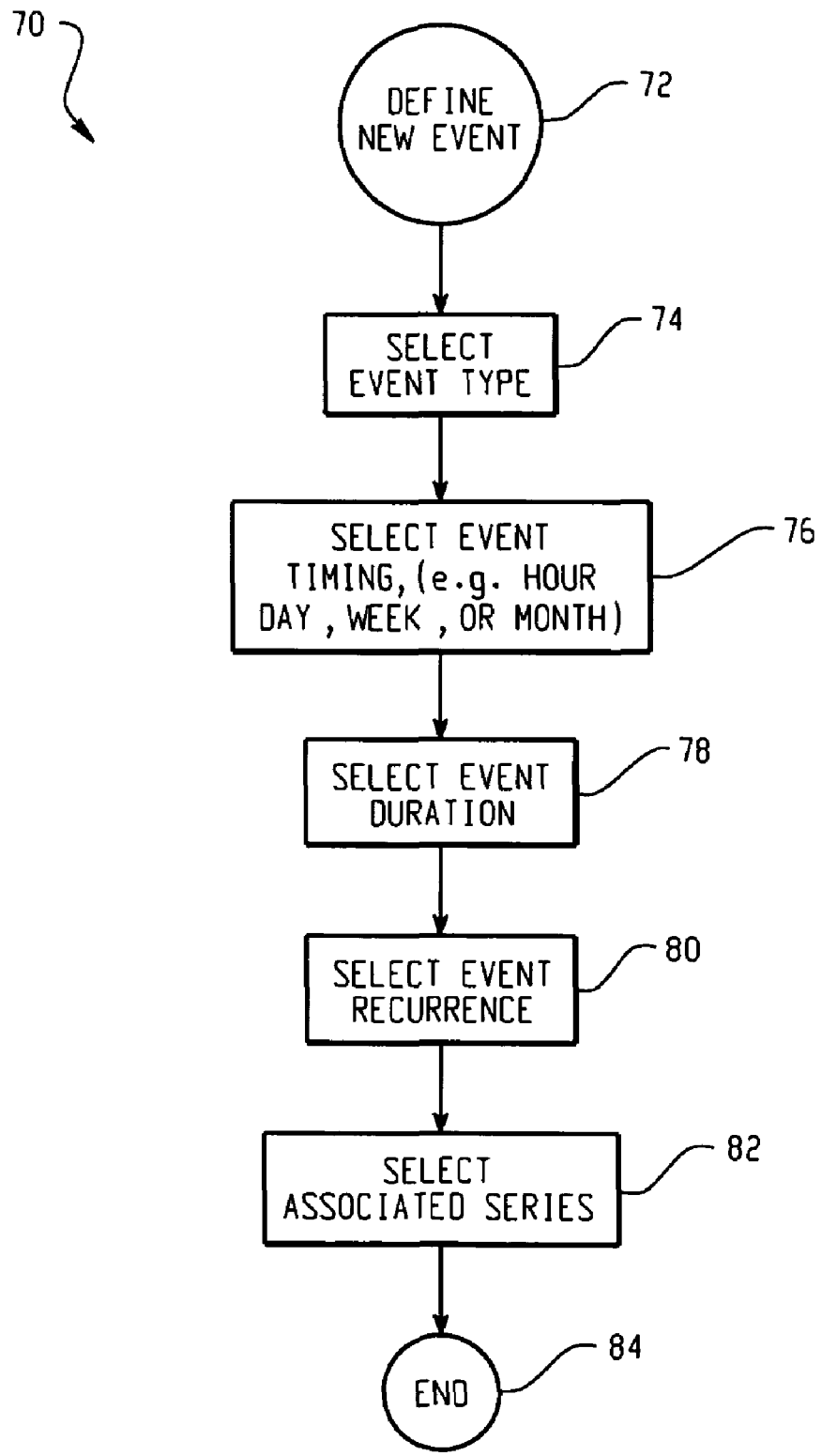
FIG. 3 is a flow diagram depicting an example method for defining events for use with a time series analysis program.

FIG. 3 is a flow diagram depicting an example method 70 for defining events for use with a time series analysis program. A new event is created in step 72, for example by inputting a name of the event into a user input region of a GUI and saving the new event to a memory location. At step 74, an event type is selected for the new event, for example by selecting a pre-defined event type from a GUI region, inputting a user-defined event type, or creating a combination event type from a plurality of pre-defined and/or user-defined event types.

At step 76, the timing for the new event is selected, for example from a user input region of a GUI. For example, a GUI may be used to specify the starting point of the event, such as the hour, day, week, month, year, and/or other indication of when the event begins. Then, at step 78 the duration of the event is defined, for example by using a region of the GUI to enter a time (if any) at which the event is scheduled to end. A recurrence of the event (e.g., monthly, yearly, no recurrence, etc.) may then be input to the GUI at step 80.

The event is associated with stored time series data at step 82. For example, one or more stored time series may be selected from a list in a region of a GUI to associate the time series with the event. Upon selecting the time series data, the event and the associated time series may, for example, be displayed together on a region of the GUI. The method for this example ends at step 84.

It should be understood that similar to other processing flows described herein, one or more of the steps and the order in the flowchart may be altered, deleted, modified and/or augmented and still achieve the desired outcome.

Figure 4:
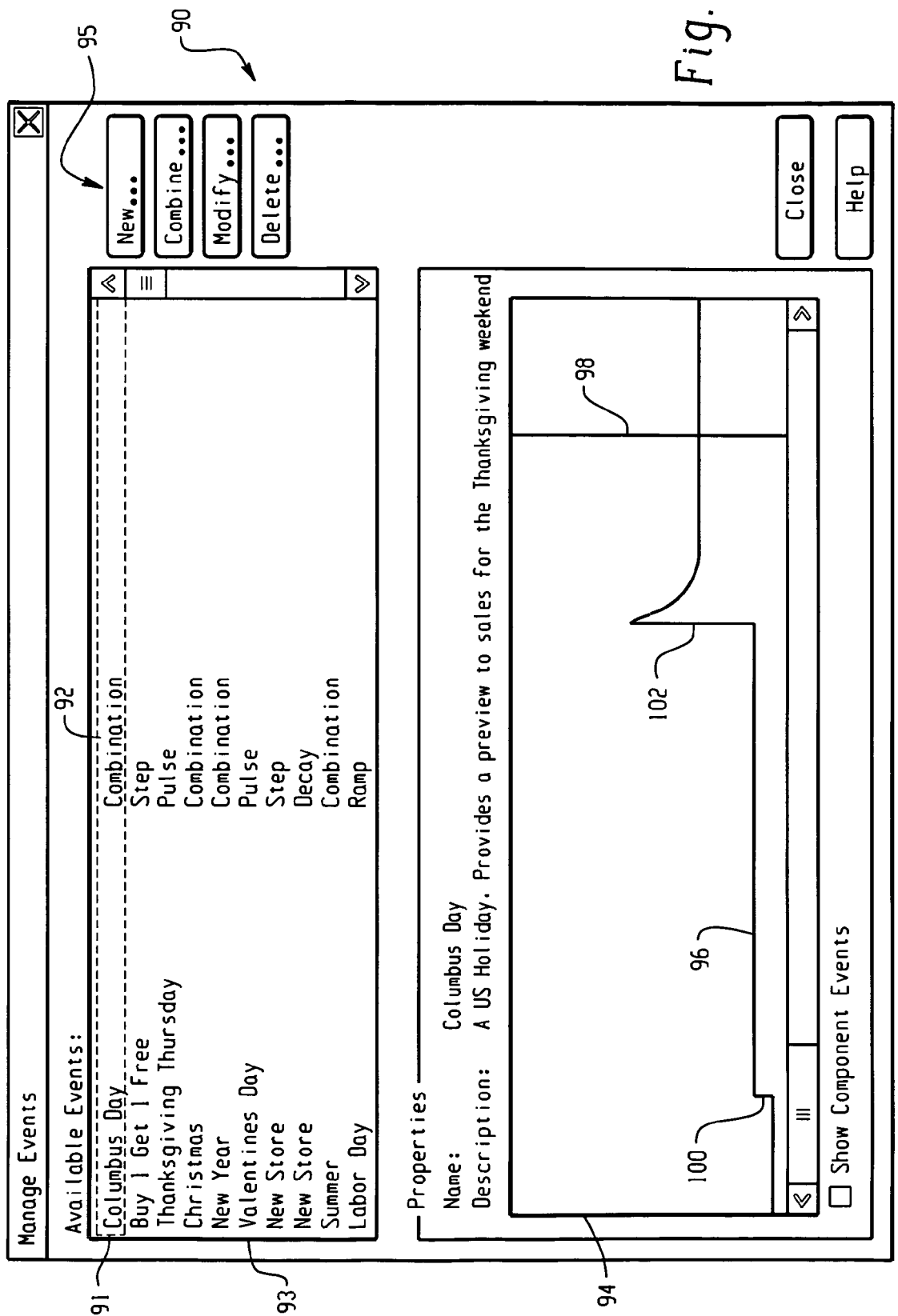
FIG. 4 depicts an example graphical user interface (GUI) for viewing a time series event.

FIG. 4 depicts an example GUI 90 for viewing a time series event. A list of previously created events 91 along with their corresponding event types 92 are displayed in a first region 93 of the GUI 90. In addition, a graphical display of a selected event is displayed in a second region 94 of the GUI 90. Also included in the GUI 90 is a plurality of user input regions 95 (e.g., graphical buttons) for causing user input regions to open for managing stored events, such as creating a new event, combining two or more events, modifying a stored event, and deleting a stored event.

Selecting one of the stored events 93 listed in the first GUI region 91 causes the event to be displayed in the second GUI region 94. In the illustrated example, the event "Columbus Day" has been selected. A graph of the statistical properties 96 for the example "Columbus Day" event is displayed in the second GUI region 94. The example graph 96 shows the effect of the "Columbus Day" event on sales (y-axis) over a period of time (x-axis). Also displayed in the second GUI region 94 is a vertical reference 98 that indicates the present point in time. The portions of the event graph 96 that are displayed to the left of the vertical reference 98 represent the effect of the event on recorded time series data, and the portions of the event graph 96 to the right of the vertical reference 98 are a time series model that is generated based on the recorded time series data and the defined event. The time series model displayed to the right of the vertical reference 98 provides a prediction of the effect of the event on future data.

The example "Columbus Day" event is a combination event, meaning that its statistical properties are defined from a combination of the statistical properties of two or more other stored events. In this example, the combination event is made up of a step-type event 100 and a decay-type event 102. For example, over the duration of the illustrated "Columbus Day" event, a new store may be opening, followed some period later by a sale. The result of the new store opening is a stepped increase in sales, represented by the step-type event 100, and the result of the sale is a temporary sharp increase in sales, represented by a decay-type event 102.

Figure 5:
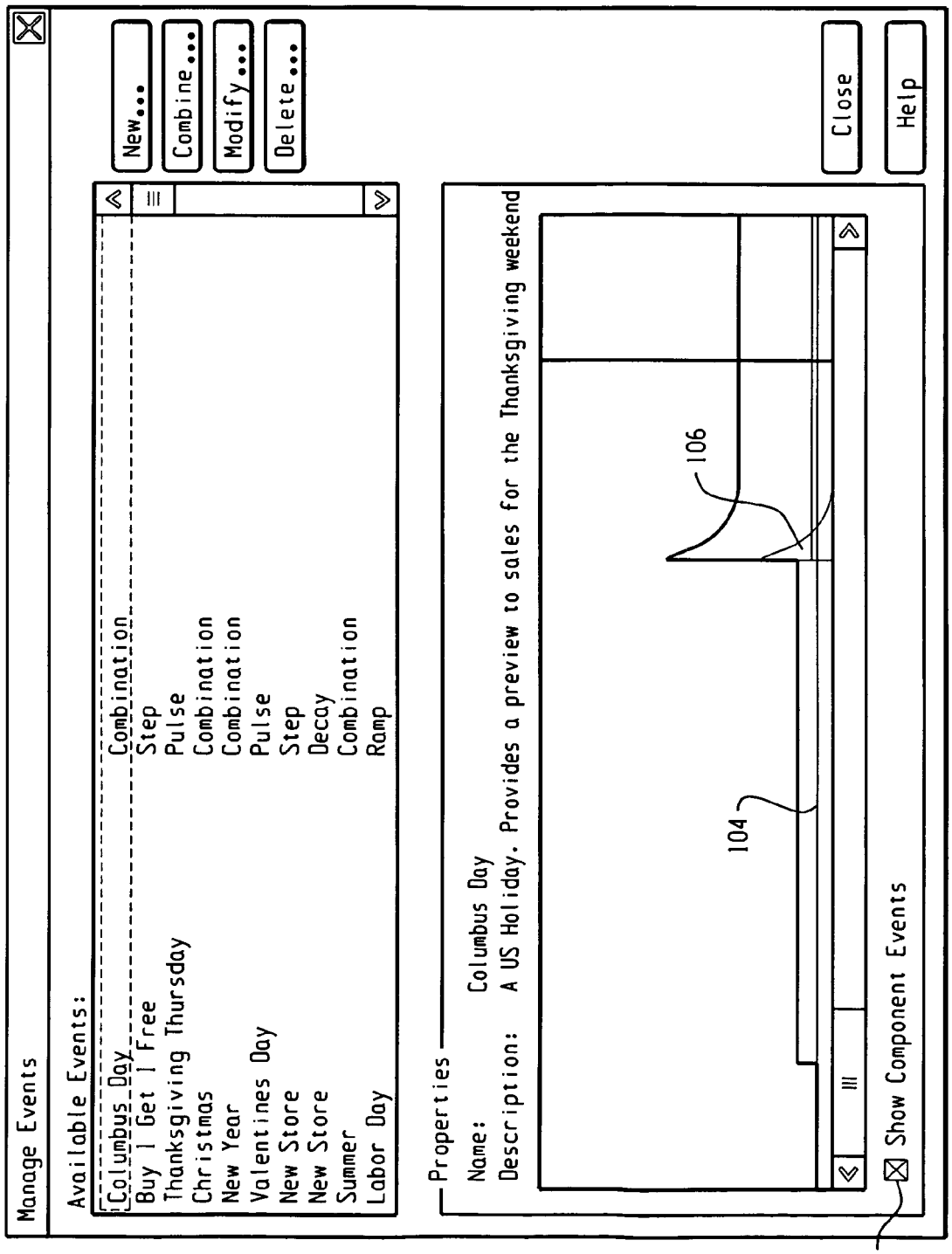
FIG. 5 depicts another example of a GUI for viewing a time series event in which the component parts of the displayed combination event are displayed.

FIG. 5 depicts another example of a GUI 103 for viewing a time series event in which the component parts 104, 106 of the displayed combination event are displayed. As illustrated, the individual statistical properties 104, 106 that make up a combination event may be displayed in a region of the GUI 103 along with the combination event by selecting a Show Component Events user input region 107 of the GUI 103. In the illustrated example, a step-type event 104 and a decay-type event 106 are the displayed component parts of the example combination-type "Columbus Day" event.

Figure 6:
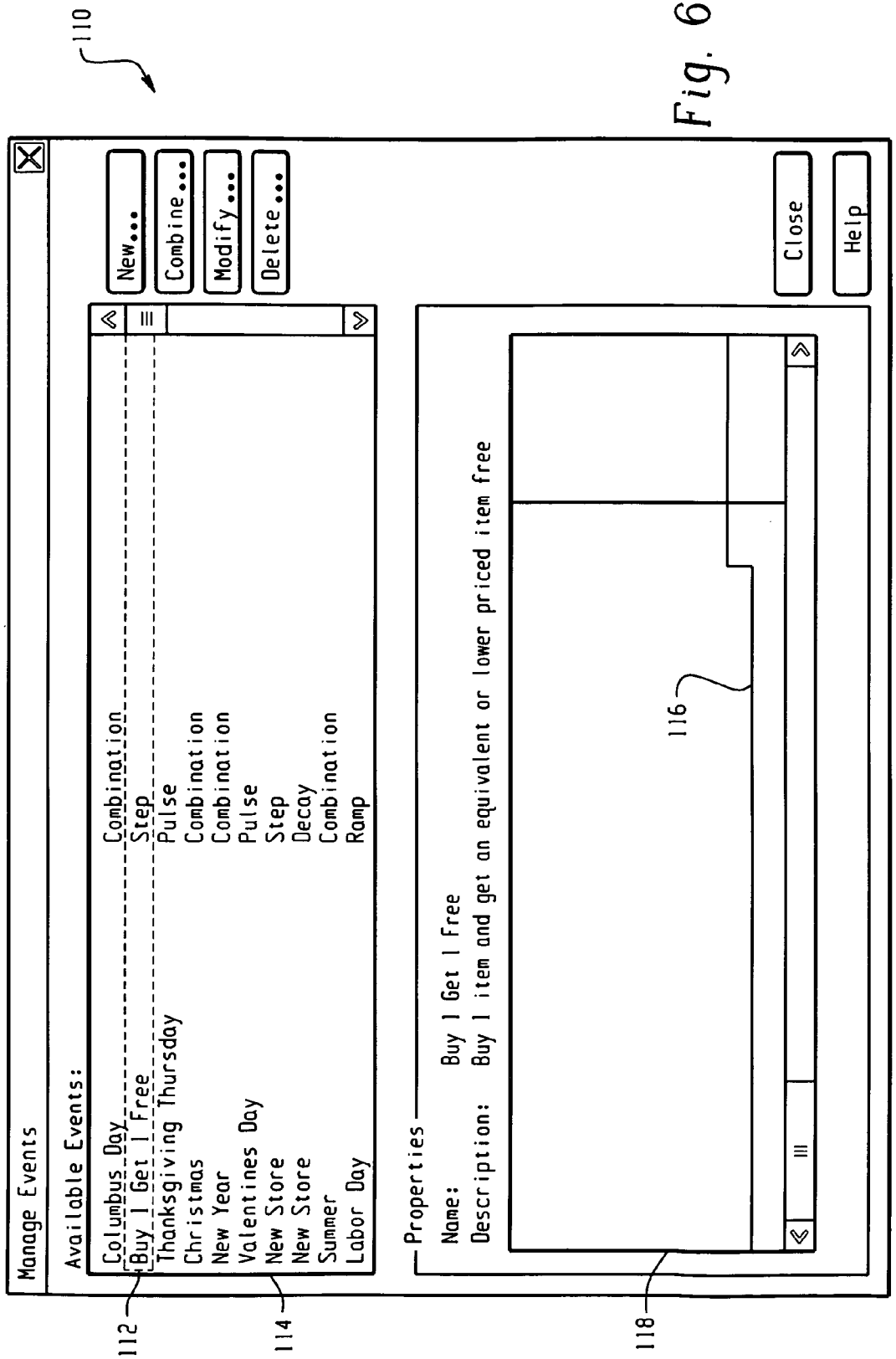
FIG. 6 depicts another example of a GUI for viewing a time series event in which a step-type event is displayed.

FIG. 6 depicts another example of a GUI 104 for viewing a time series event in which a step-type event is displayed. In this example, a user has selected a step-type event 112, entitled "Buy 1 Get 1 Free," from the first region 114 of the GUI 110. A graph 116 of the example step-type event 112 is displayed in the second GUI region 118. As illustrated, the step-type event causes a stepped increase in the time series data (i.e., because the "Buy 1 Get 1 Free" event caused, and is predicted to continue to cause, a stepped increase in sales.) Examples of events that may cause a step-type event are opening a new store, an extended sale, etc. In the illustrated example, the duration of the step-type event 116 extends beyond the displayed time period. However, step-type events may have a limited duration (e.g., in the case of an extended sale), or may have an indefinite duration (e.g., in the case of a new store).

Figure 7:
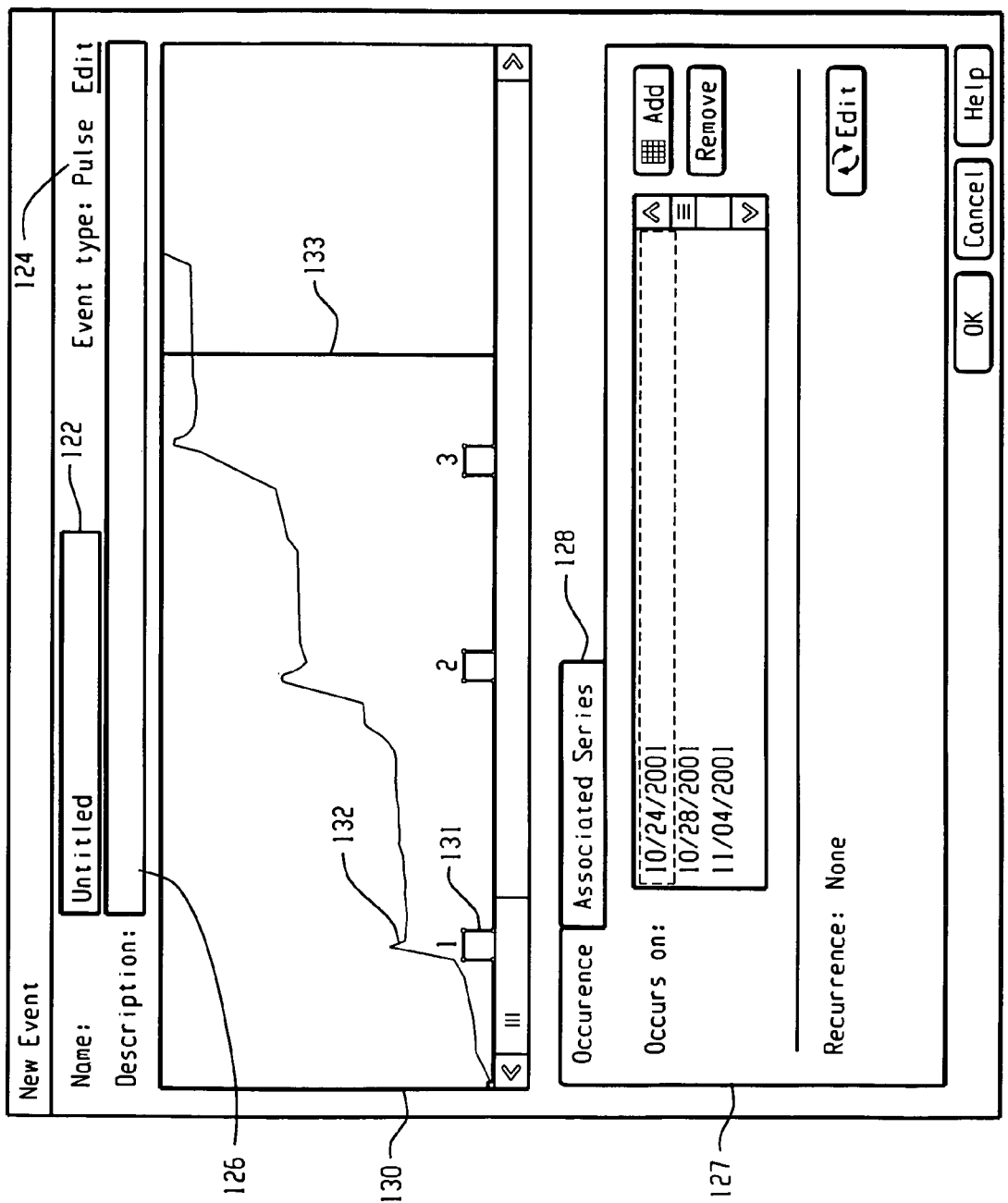
FIG. 7 depicts an example GUI for defining properties of a time series event.

FIG. 7 depicts an example GUI 120 for defining properties of a time series event. This GUI 120 may, for example, be provided by selecting the "New" user input 95 shown in FIG. 4. The GUI 120 includes user input regions 122, 124, 126 for naming the event, selecting an event type, and entering a description of the event. The GUI 120 also includes an event selection region having an Occurrence tab 127 and an Associated Series Tab 128. The Occurrence tab 127 of the event selection region may be used for defining when the event occurs and for defining the duration and recurrence of the event. The Associated Series tab 128 of the event selection region may be used for associating one or more time series 132 with the event. In addition, a display region 130 is provided for displaying a graph of the event 131 along with the associated time series data 132.

In the illustrated example, a time series event 131 having three occurrences (1, 2 and 3) is displayed in the display region 130 along with a graph of the associated time series data 132. The example event 131 is a pulse-type event having occurrences on three days, Oct. 24, Oct. 28 and Nov. 4. The event 131 may, for example, have been defined by examining the graph 132 of the time series data and noting the pulse-type increases in the data and recognizing that the data spikes correspond with some particular event. For instance, a one day sale may have occurred on each of these three days, resulting in the temporary pulse-type spikes in the time series data 132. If the recurrence of the event is known (e.g., the sale will continue one a week for several months), then the event 131, which is defined with reference to the stored time series data, may be incorporated into a time series model of the data in order to predict how the event will affect future data. For instance, in the illustrated example the time series model, which is displayed to the right of the vertical reference 133, may show another pulse-type spike in the data if the event is scheduled to reoccur.

In one example, events may be added and/or modified using the display region 130 of the GUI 120. For instance, the duration of an event may be modified by clicking and dragging an edge of an event on the graph 131. A new event may be added to the graph 131, for example by right-clicking on a portion of the graph 131 or by some other suitable means.

Figure 8:
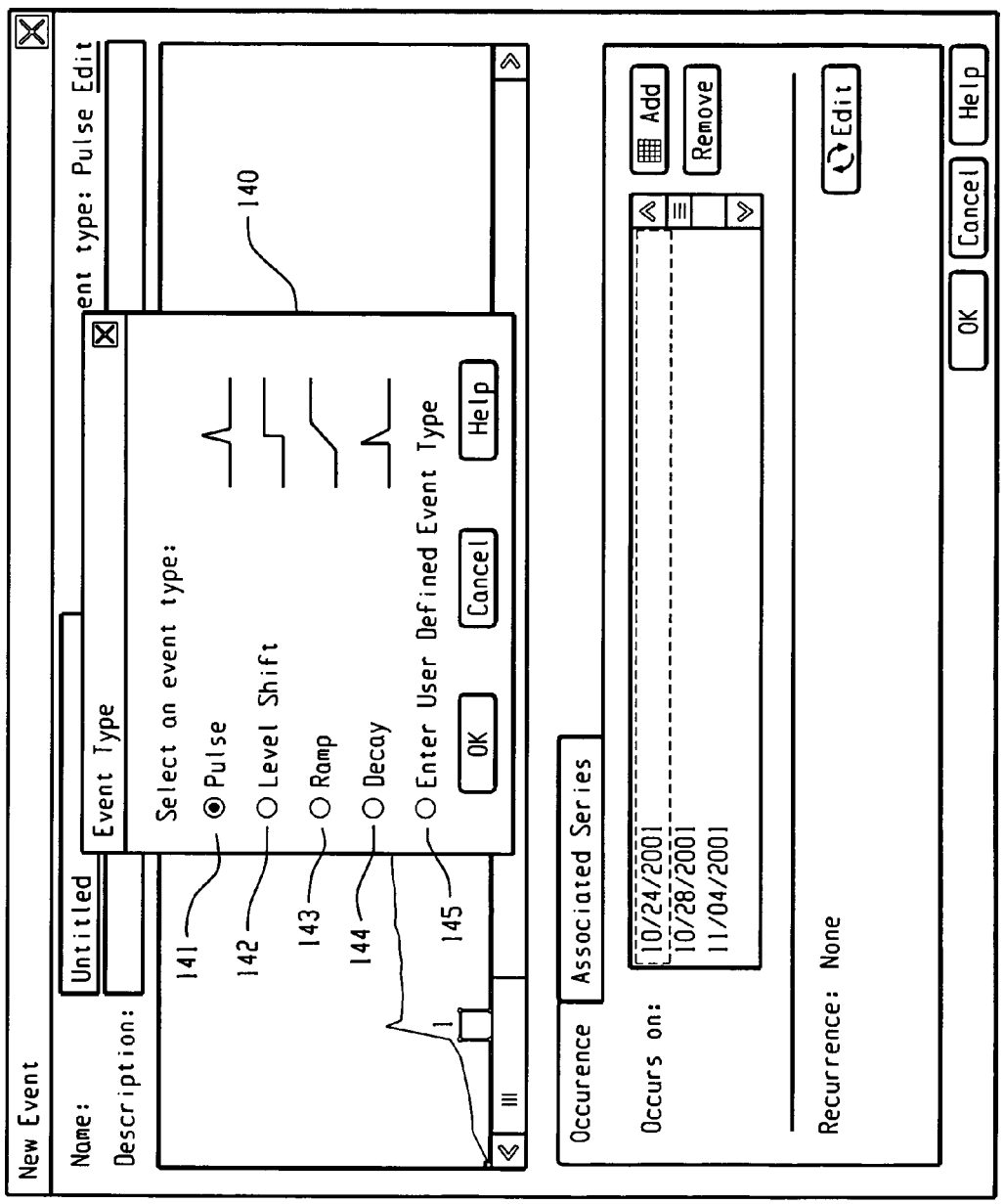
FIG. 8 depicts an example dialog window that may be used to select an event type.
Figure 22:
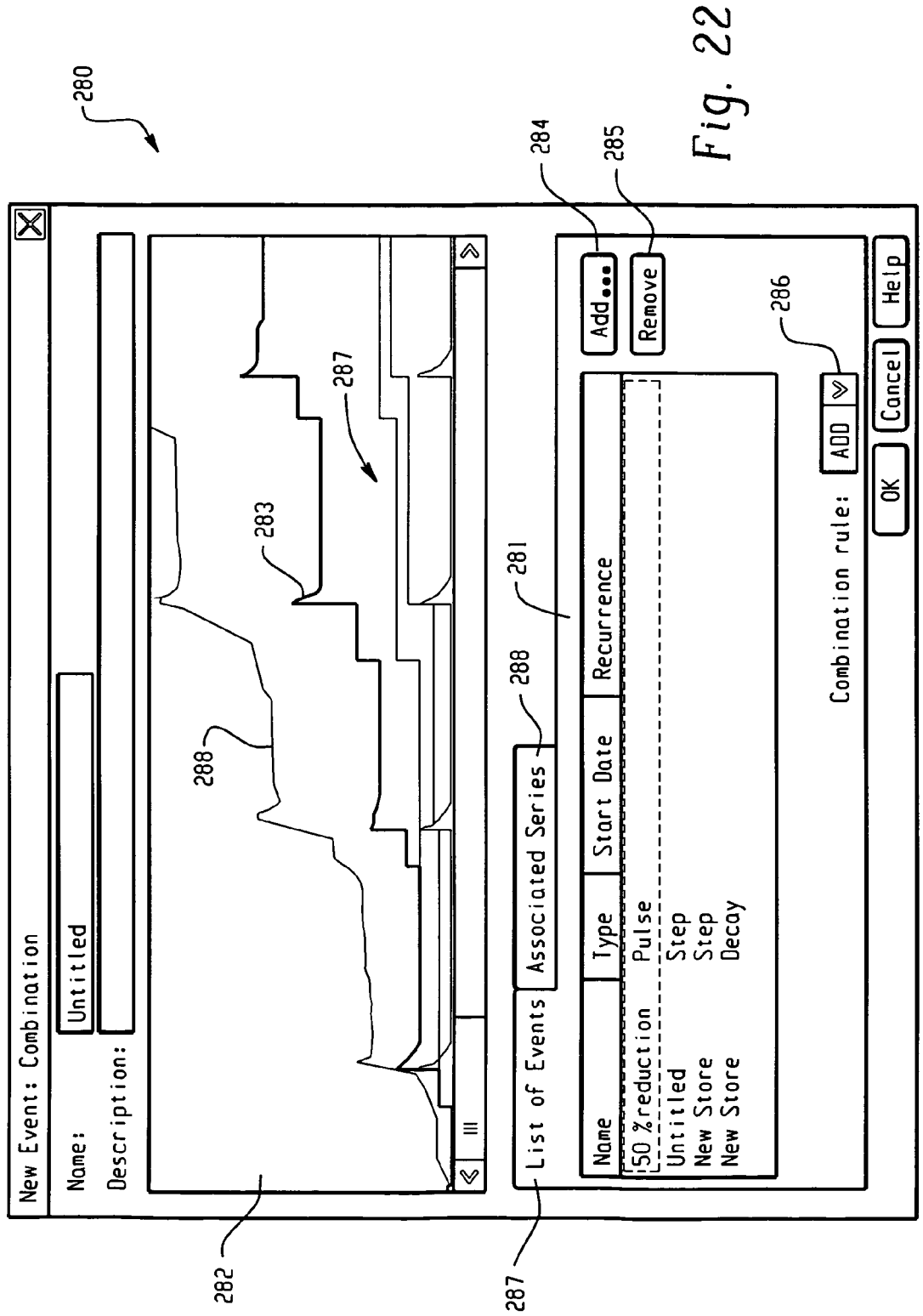
FIGS. 22-24 depict an example GUI for defining a combination event.

FIG. 8 depicts an example dialog window 140 that may be used to select an event type. The event selection window 140 may, for example, be provided by selecting "Edit" in the user input region 124 shown in FIG. 7. The event selection window 140 includes user input regions 141-144 for selecting one of a plurality of predefined event types. Example predefined event types that may be selected include a pulse-type event 141 indicating a temporary spike in the time series data, a level shift event 142 indicating a sharp increase in the time series data, a ramp-type event 143 indicating a gradual increase in the time series data, and a decay-type event 144 indicating a sharp increase in the time series data followed by a gradual decrease. In addition, the event selection window 140 includes a user input region 145 for entering a user defined event type. For example, selecting the user defined event type region 145 may provide another user input region in which a user may insert software code to define an event type. In another example, selecting the user defined event type region 145 may enable the user to create a combination type event, for example as illustrated in FIG. 22.

Figure 9:
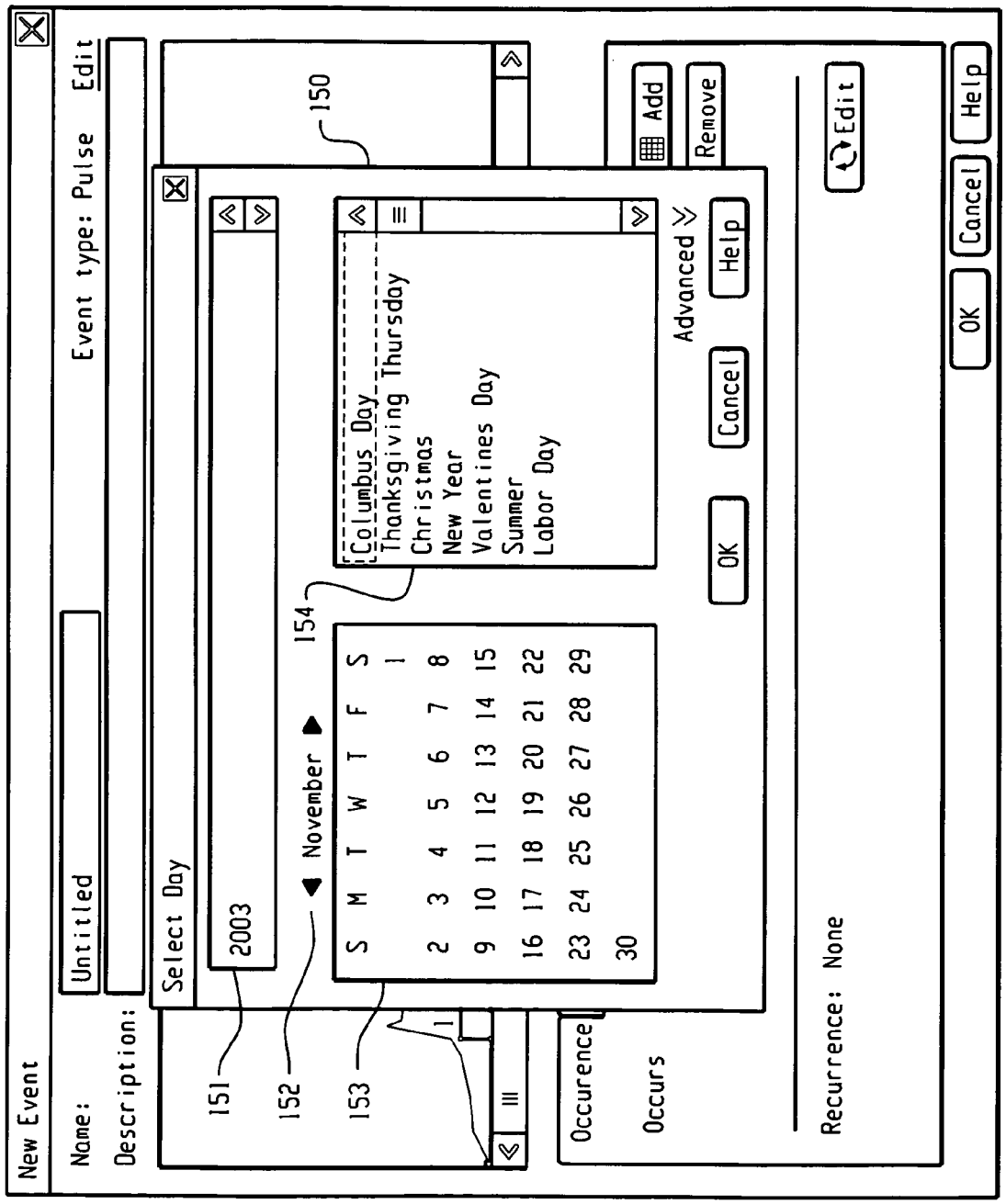
FIG. 9 depicts an example dialog window for selecting one or more days on which the event will occur.

FIG. 9 depicts an example dialog window 150 for selecting one or more days on which the event will occur. This occurrence day selection window 150 may, for example, be presented by selecting "Add" in the user input region 127 shown in FIG. 7. The occurrence selection window 150 includes user input regions 151-153 for selecting a year, month and day on which the event begins. In addition, another user input region 154 is provided to select a predefined day or time period for the event, such as a holiday, season, etc.

Figure 10:
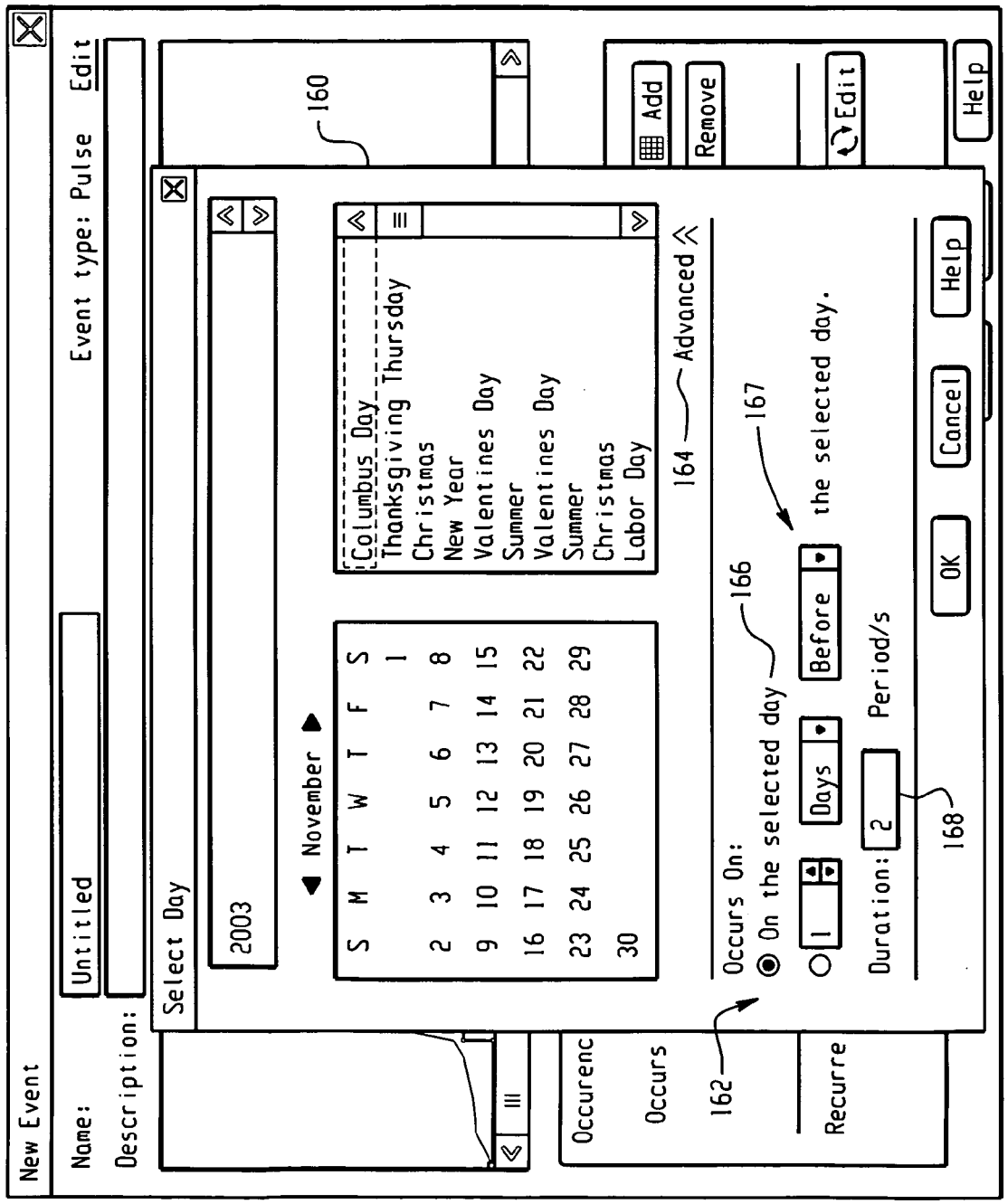
FIG. 10 depicts another example dialog window for selecting one or more days on which the event will occur.

FIG. 10 depicts another example dialog window 160 for selecting one or more days on which the event will occur. In this example, the occurrence day selection window 150 includes advanced settings 162 for defining when the event occurs. The advanced settings 162 may, for example, be displayed or hidden by selecting an "Advanced" user input region 164 on the GUI 160. The advanced settings 162 include user inputs 166-168 for defining that the event will occur on a selected day 166, for defining that the event will occur at some time interval before or after a selected day 167, and for defining a duration of the event 168.

Figure 11:
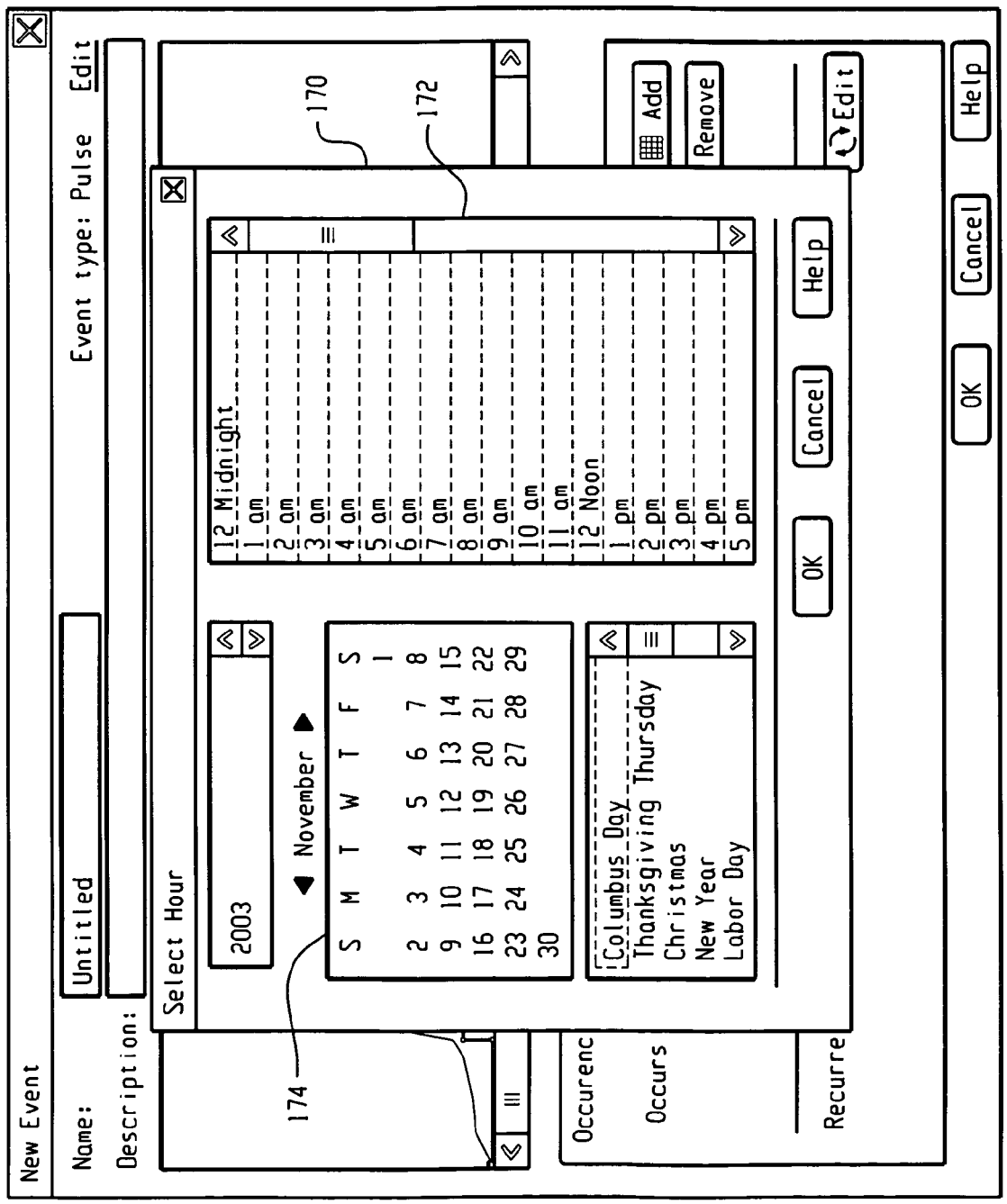
FIG. 11 depicts an example dialog window for selecting a time of day at which the event will begin.

FIG. 11 depicts an example dialog window 170 for selecting a time of day at which the event will begin. The occurrence hour selection window 170 includes a region 172 for defining the time of day that the event is scheduled to begin. If the event is scheduled to occur on multiple days, then the selected time of day 172 is applied to all of the selected days 174. Alternatively, if a user desires to have different starting times 172 for one or more of the event days 172, then the occurrence selection window 170 may be used multiple times to separately define the starting times for each day of the event.

Figure 12:
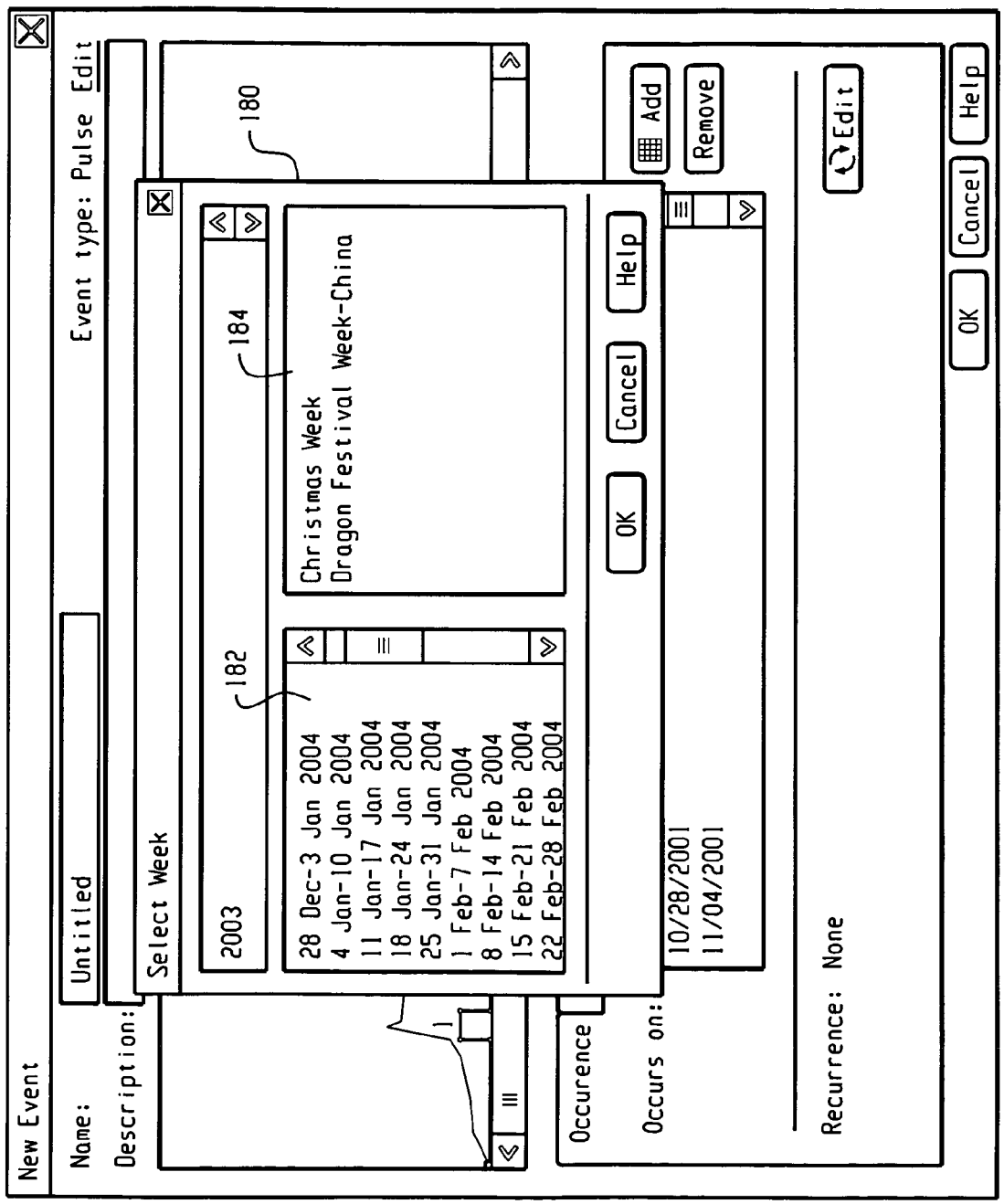
FIG. 12 depicts an example dialog window for selecting one or more weeks on which the event will occur.

FIG. 12 depicts an example dialog window 180 for selecting one or more weeks on which the event will occur. In this example, the occurrence week selection window 170 includes a first region 182 for selecting from the 52 weeks in a calendar year, and a second region 184 for selecting from predefined event weeks (e.g., holidays, festivals, etc.).

Figure 13:
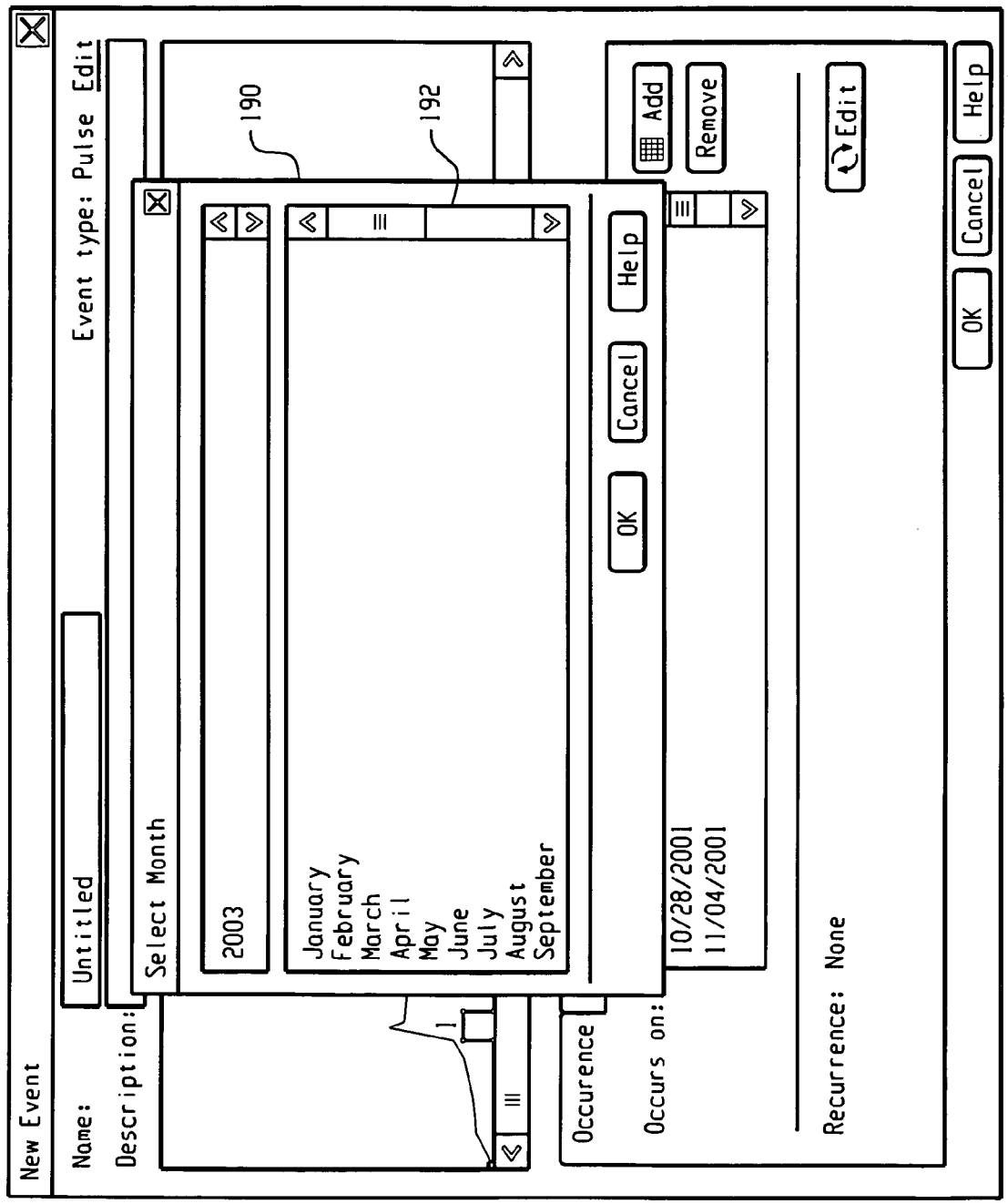
FIG. 13 depicts an example dialog window for selecting one or more months on which the event will occur.

FIG. 13 depicts an example dialog window 190 for selecting one or more months on which the event will occur. One or more months for the event may be defined by selecting from the months listed in a user input region 192.

Figure 14:
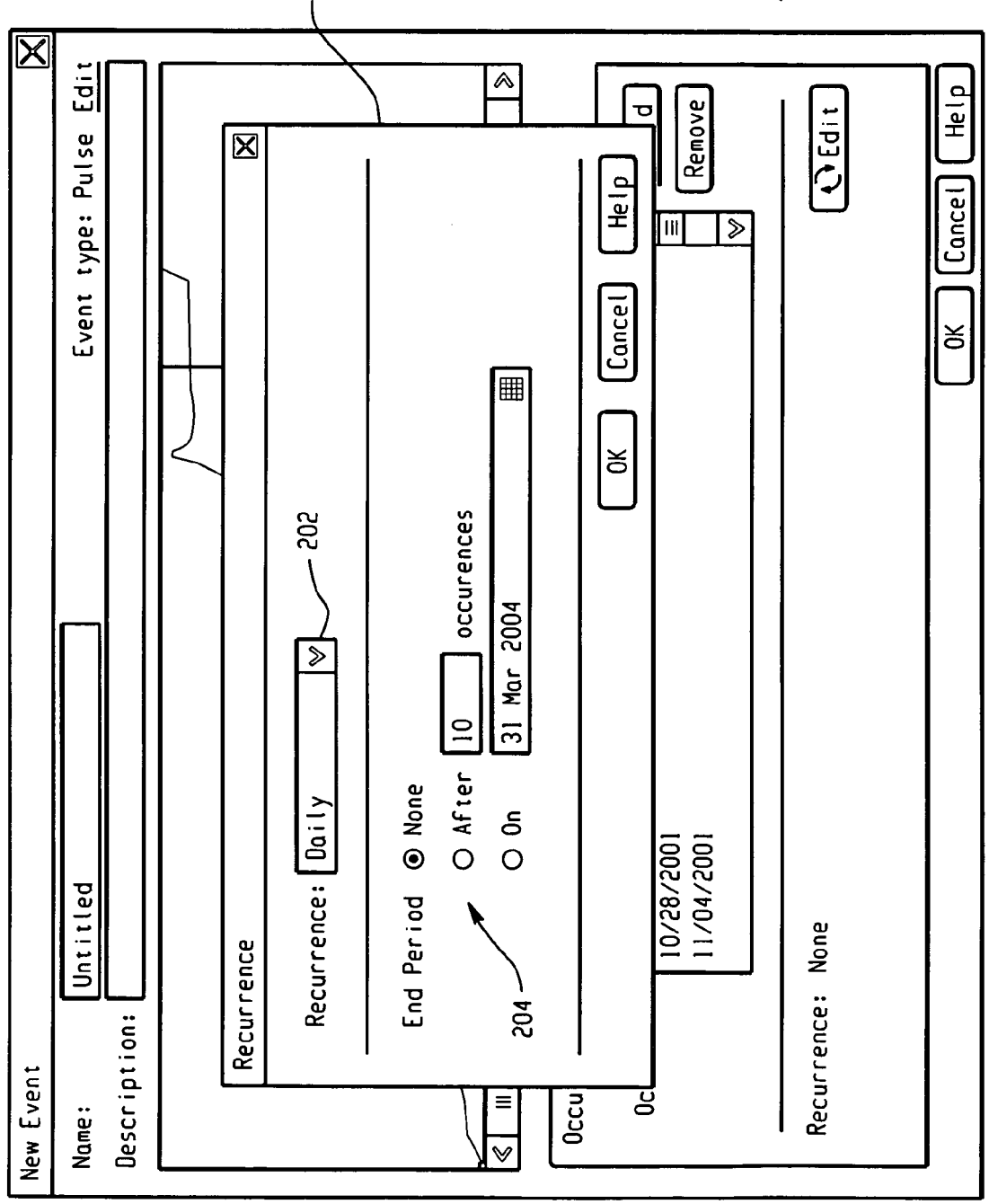
FIG. 14 depicts an example dialog window for defining a recurrence for the event.

FIG. 14 depicts an example dialog window 200 for defining a recurrence for the event. The recurrence selection window 200 includes a first region 202 for selecting a recurrence period for the event. Example recurrence periods that may be selected include daily, weekly, monthly, yearly, and no recurrence. In addition, the recurrence selection window 200 also includes a second region 204 for defining an end of the recurrence. For example, the second region 204 may be used to specify that the recurrence has no end period (e.g., a continuously recurring holiday), ends after a specified number of occurrences, or ends on a specified date.

Figure 15:
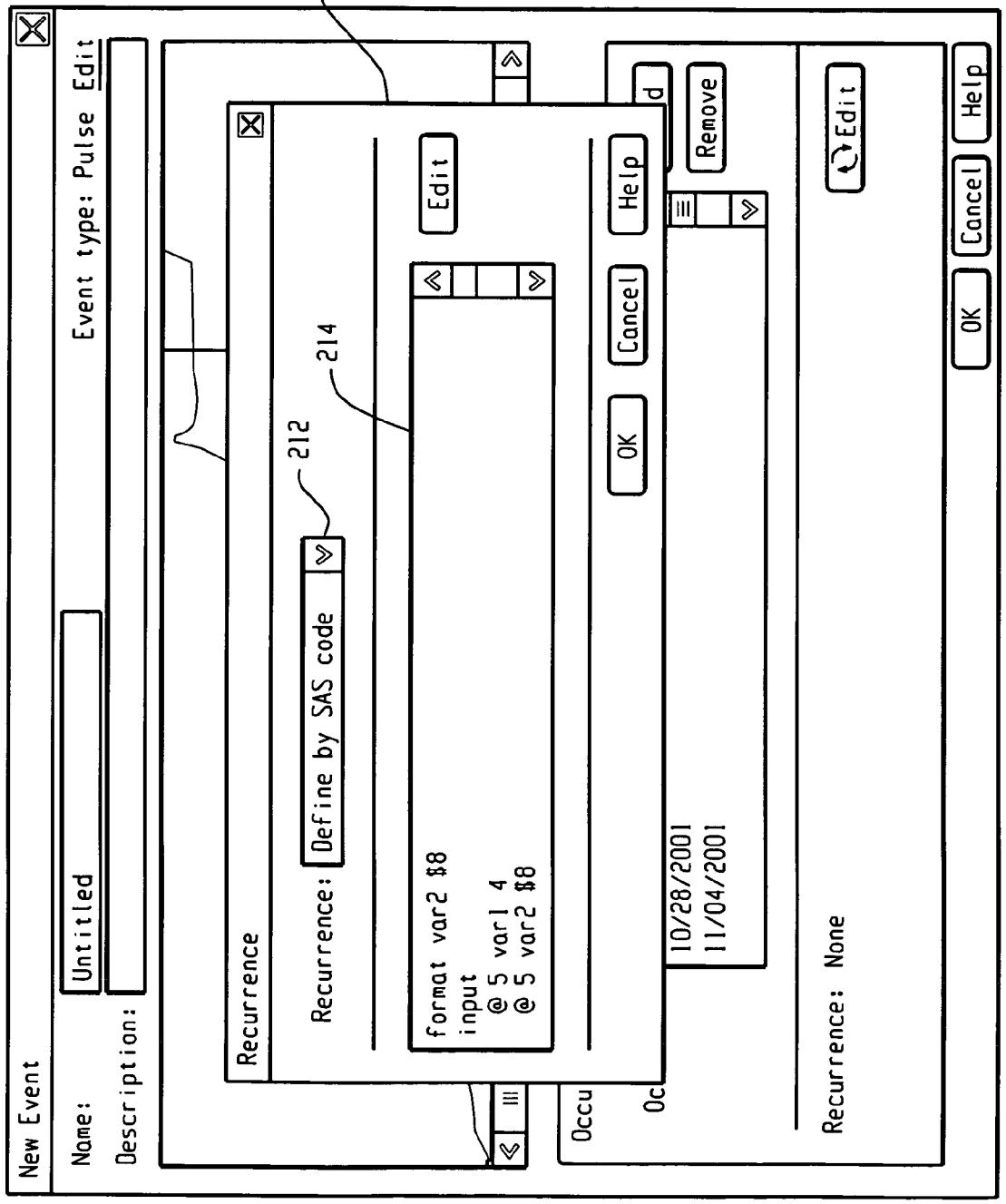
FIG. 15 depicts another example dialog window for defining a recurrence for the event.

FIG. 15 depicts another example dialog window 210 for defining a recurrence for the event. In this example, the recurrence selection window 210 enables a user to input computer instructions for defining the recurrence of the event. The window 210 includes a first region 212 for defining the type of computer instructions (e.g., SAS code), and a second region 214 for inputting the computer instructions. This window 210 may, for example, be used instead of the recurrence selection window 200 depicted in FIG. 14 in order to define a more complex recurrence pattern.

Figure 16:
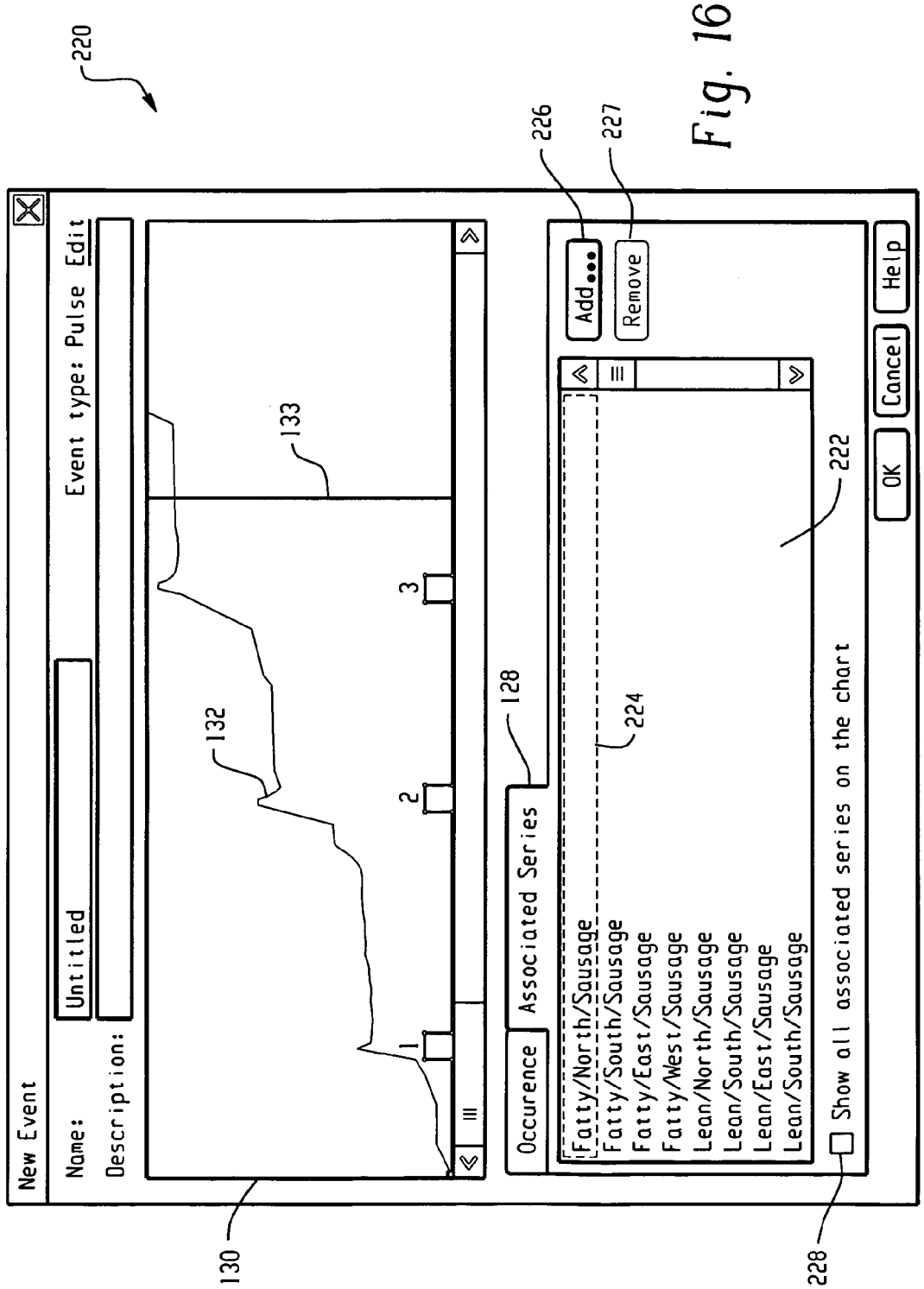
FIG. 16 depicts an example GUI for defining properties of a time series event.

FIG. 16 depicts an example GUI 220 for defining properties of a time series event, showing an example of the Associated Series tab 128 in the event selection region 222. The Associated Series tab 128 displays one or more time series that are currently associated with the event. Selecting a time series from the region 222 causes the selected time series 224 to be displayed as a graph 132 in the display region 130. In the illustrated example, a time series 224 entitled "fatty/north/sausage" has been selected and is displayed as a graph 132. User input regions 226 and 227 are also included to associate additional time series data with the event and to remove an associated time series, respectively. In addition, a user input region 228 is provided to cause each of the associated time series to be displayed simultaneously in the display region 130.

FIGS. 17-20 depicts an example dialog window 230 for associating time series data with an event. The dialog window 230 depicted in FIGS. 17-20 may, for example, be provided by selecting the Add user input region 226 in the GUI 220 shown in FIG. 16. The example dialog window 230 shown in FIGS. 17-20 includes a user input region 232 for choosing a selection mode. The available selection modes may, for example, include a mode for selecting one or more stored time series (e.g., FIG. 17), a mode for selecting one or more groups of stored time series (e.g., FIG. 18), and a mode for applying a filter to a plurality of stored time series to select one or more time series (e.g., FIG. 19).

Figure 17:
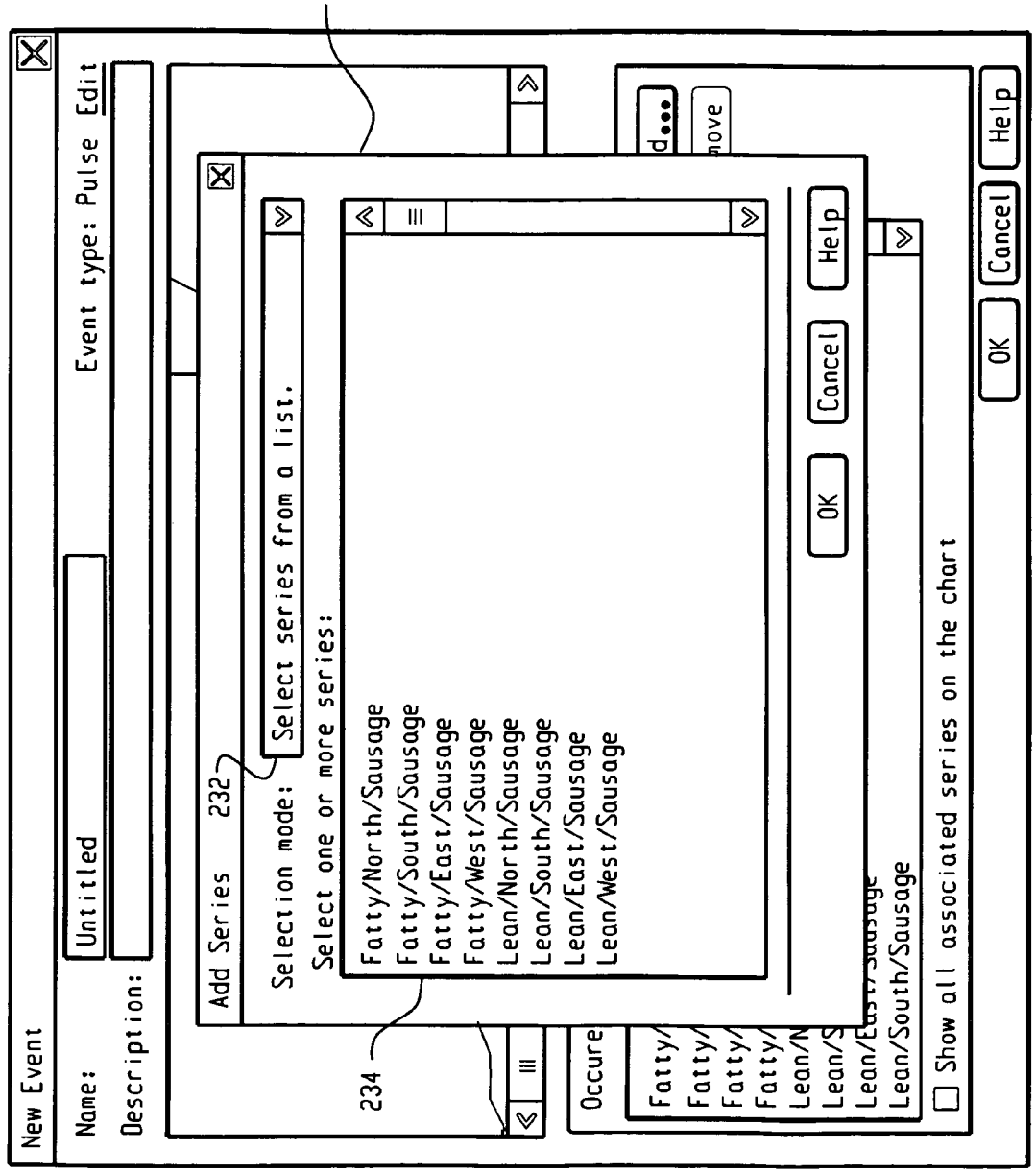
FIGS. 17-20 depicts an example dialog window for associating time series data with an event.
Figure 18:
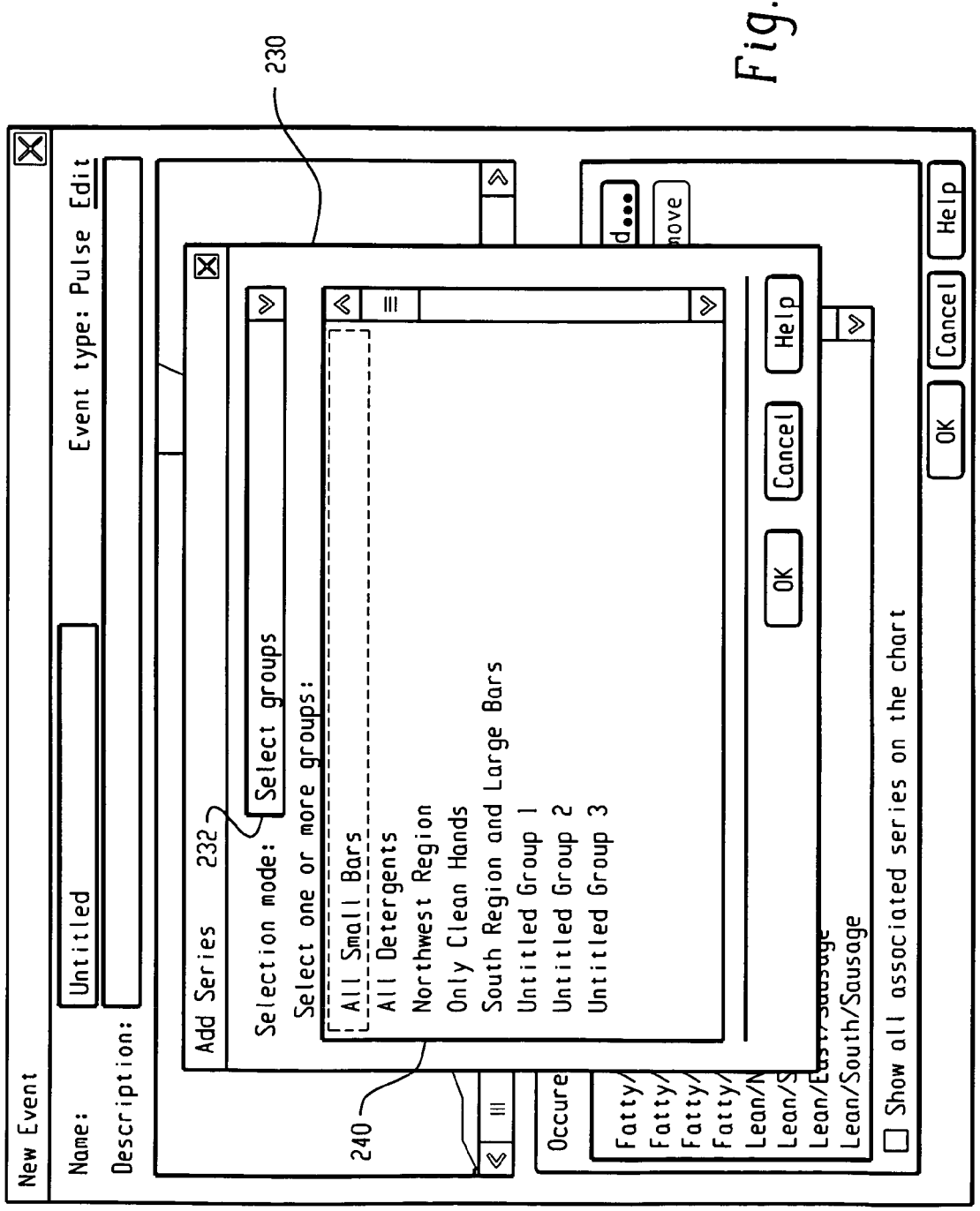

With reference to FIG. 17, choosing the select series mode in the user input region 232 of the dialog window 230 provides a region 234 for selecting one or more stored time series to associate with the event. Alternatively, one or more predefined groups of time series data 240 may be associated with the event by choosing the select groups mode in the user input region 232, as depicted in FIG. 18. In addition, a filter mode may be selected, as depicted in FIG. 19, in order to identify one or more stored time series that meet a desired criteria.

Time series data may be stored with identifying information that may be used to filter the data, for example identifying information may be included in the name of the stored time series data as depicted in FIG. 17. With reference to FIG. 19, selecting the filter mode in the user input region 232 of the dialog window 230 provides a user input region 250 for applying one or more filters to identify stored time series data, for example using identifying information associated with the stored data. In the illustrated example, one filter has been selected to identify all stored time series data that has identifying information indicating that it is from a North Region. Cross-referencing FIGS. 17 and 19, the filter criteria input in FIG. 19 would select the stored series entitled "Fatty/North/Sausage" and "Lean/North/Sausage," which both include identifying information indicating that they are associated with the North Region.

Figure 19:
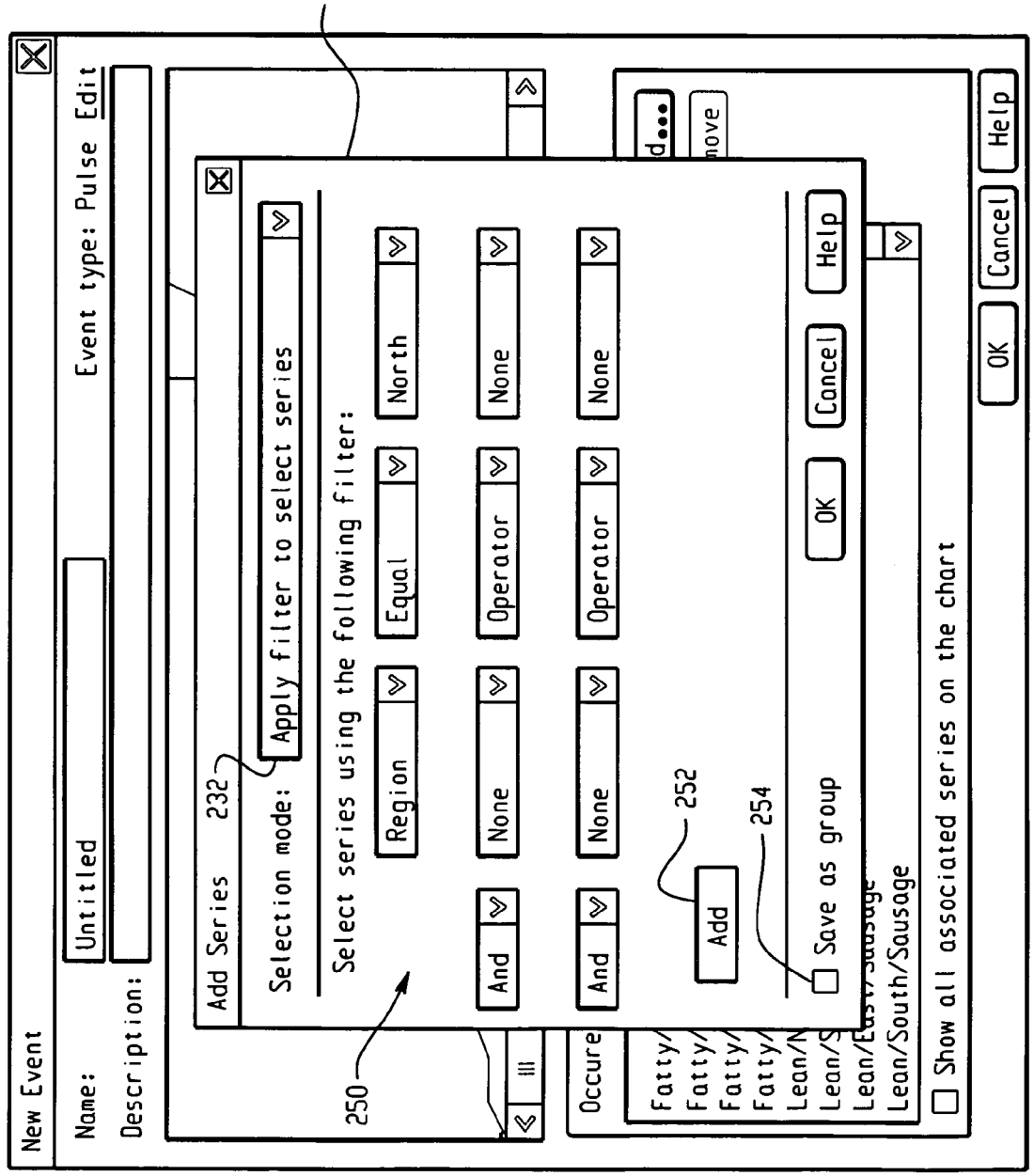
Figure 20:
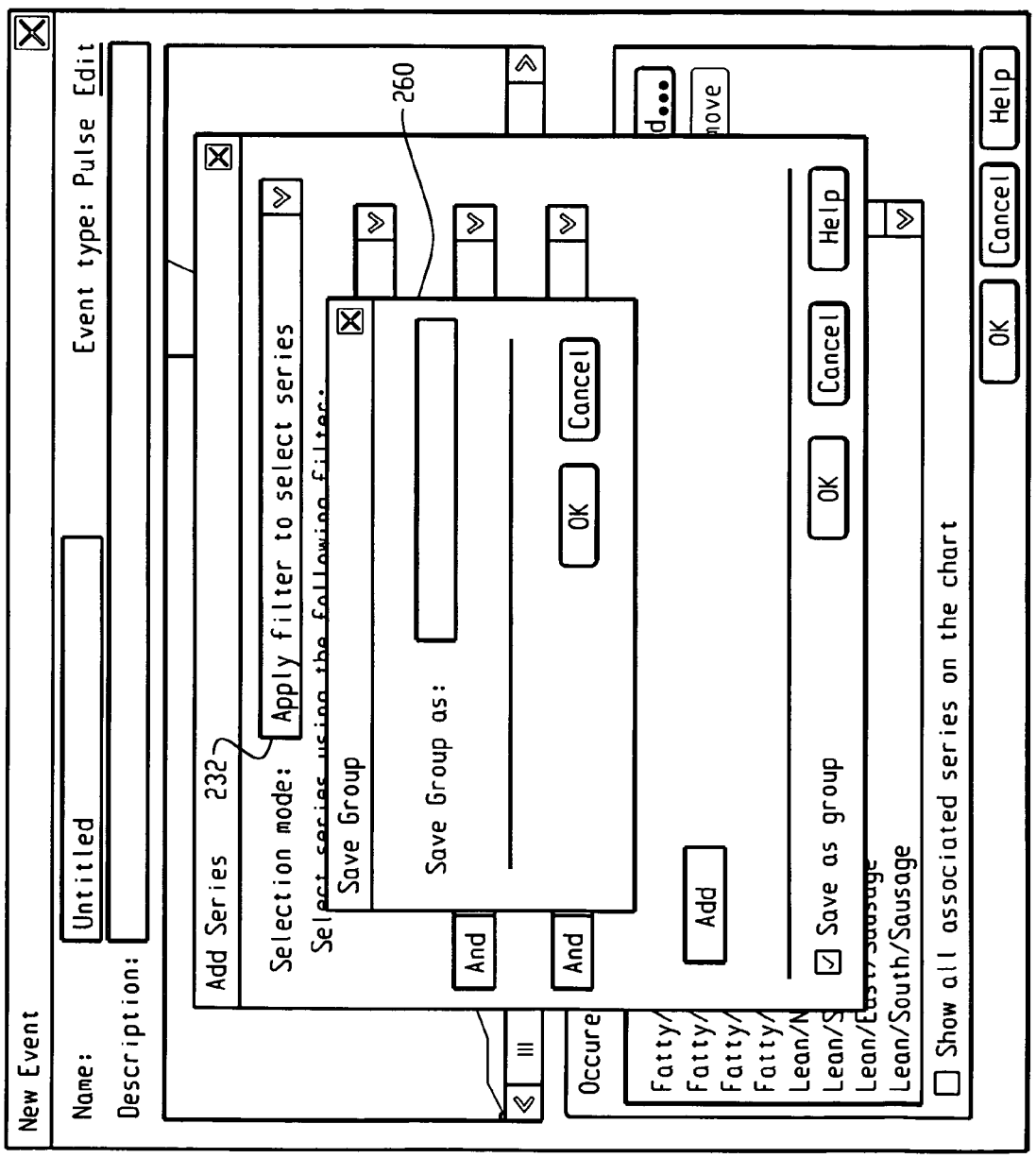

Time series data that is identified by the filter criteria may be associated with the event, for example by selecting the Add input region 252 of the dialog window 230 shown in FIG. 19. In addition, time series data identified using the filter criteria may be stored as a new group of time series data, for example by selecting the Save As Group input region 254 shown in FIG. 19. Selecting the Save As Group input region 254 may provide a dialog window GUI 260 for inputting a name for the a new group and saving the group to memory, as depicted in FIG. 20.

FIG. 21 depicts an example GUI 270 for modifying properties of a stored time series event. This GUI 270 may, for example, be provided by selecting the Modify user input 95 shown in FIG. 4. The GUI 270 for modifying stored time series events may include at least the same features as the GUI for defining properties of a new time series event illustrated in FIGS. 7 and 16, and may be used to modify the properties of an event that has already been defined. For example, in the illustrated embodiment the GUI 270 is displaying properties of the stored "Columbus Day" event, which may be modified as described above such as with reference to FIGS. 7-20. In addition, the modify event GUI 270 also includes a user input 272 for saving the modified event as a copy, for example using a different event name or otherwise distinguishing the modified event from the unmodified event.

Figure 23:
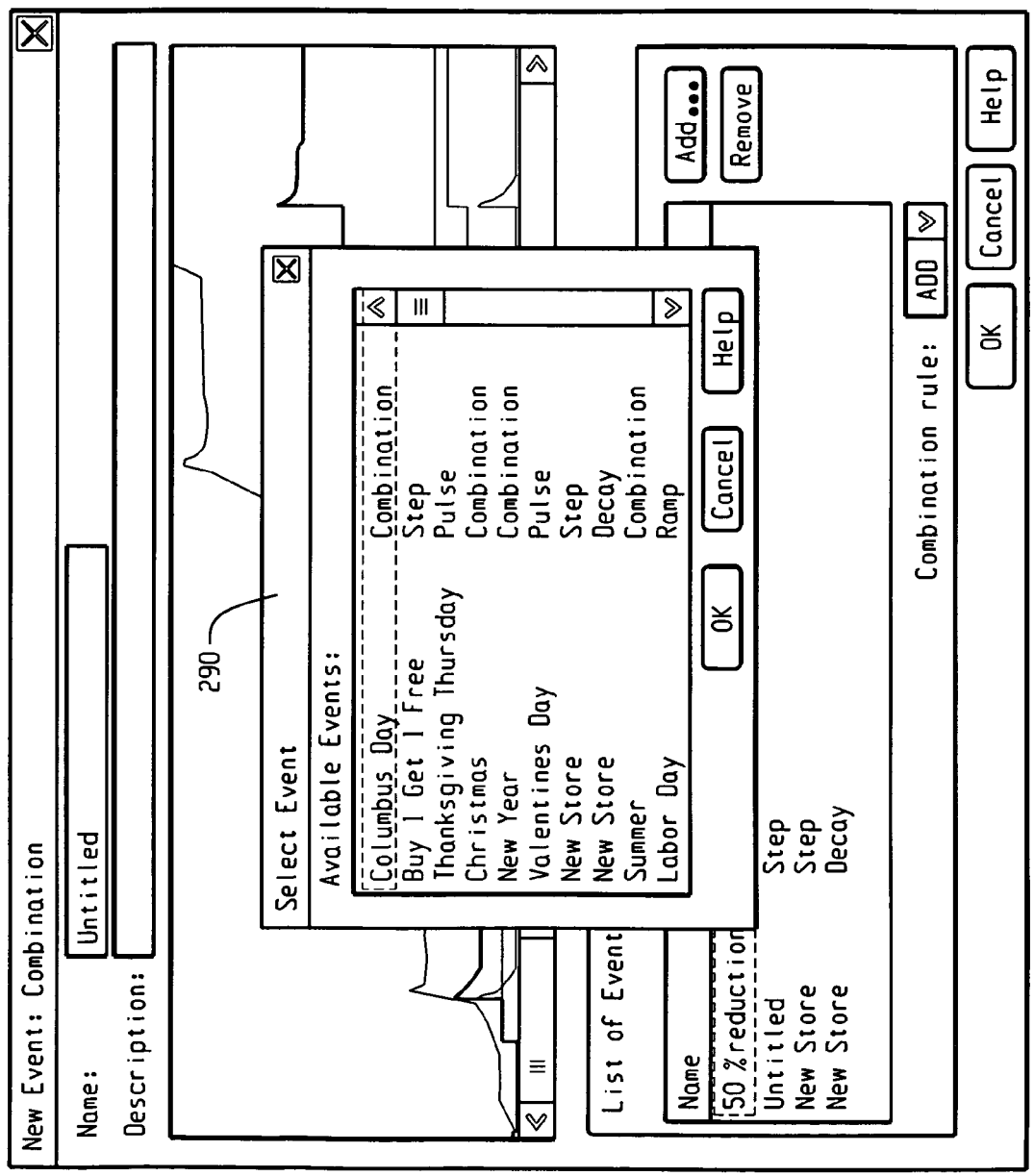
Figure 24:
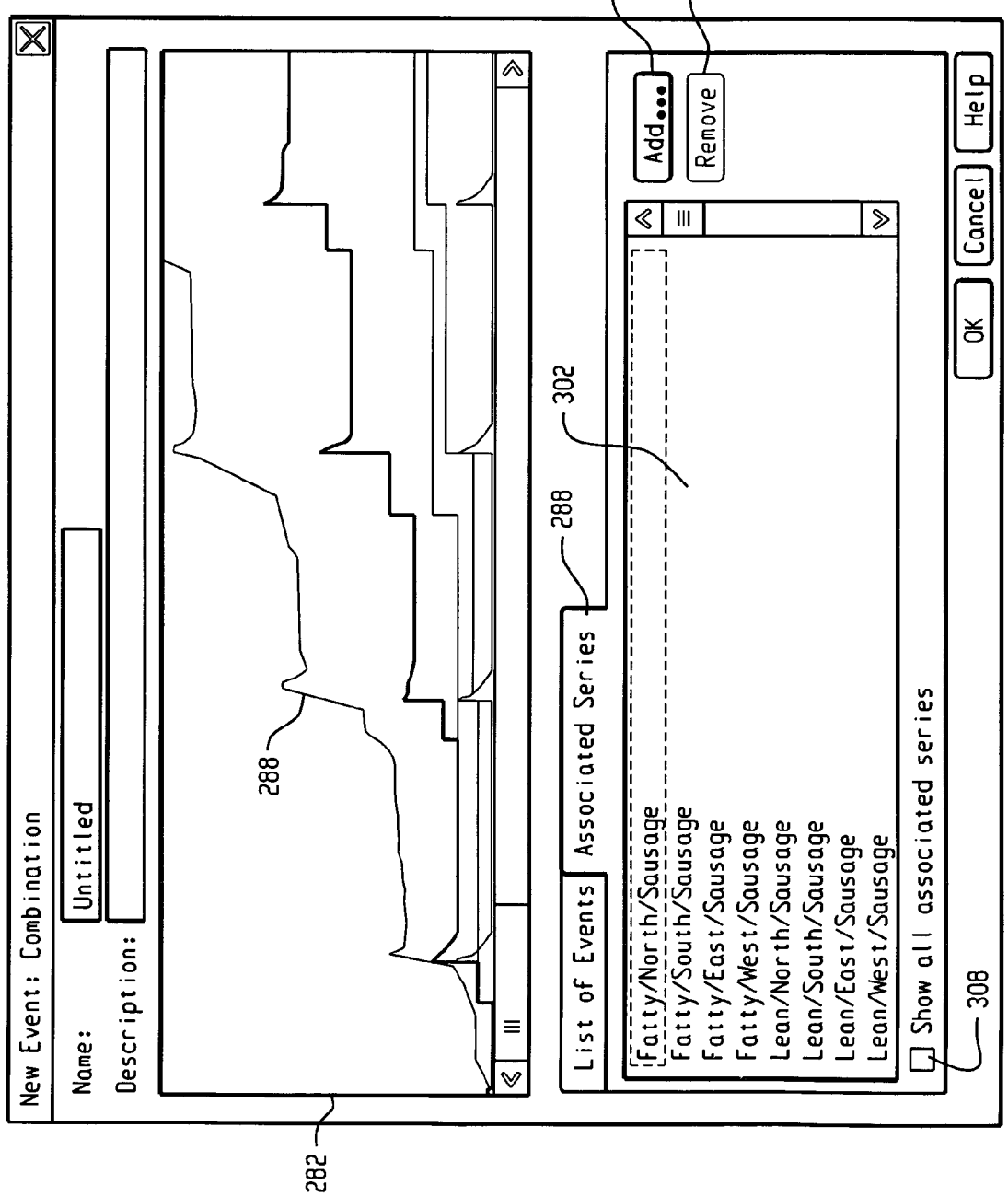

FIGS. 22-24 depict an example GUI 280 for defining a combination event. This GUI 280 may, for example, be provided by selecting the Combine user input 95 shown in FIG. 4. With reference to FIG. 22, the GUI 280 includes an event selection region 281 for defining the events included in the combination event, and a display region 282 for displaying a graph of the combined event 283. The event selection region 281 includes a List of Events tab 287 and an Associated Series tab 288.

The List of Events tab 287 in the event selection region 281 lists the events currently included in the combined event and also includes user input regions 284, 285 for adding and removing events and a user input region 286 for defining a combination rule for the event. The combination rule 286 defines the statistical operation that is used to combine the selected events, for example the events may be added, averaged or combined using some other available statistical operation. The display region 282 displays a graph of the combined event 283, and may also display graphs of the component events 287 and the associated time series data 288. Selecting the Add user input 284 displays an event selection dialog window 290, as depicted in FIG. 23. The event selection window 290 includes a list of stored events, which may be selected for inclusion as components of the combination event.

An example of the Associated Series tab 288 of the event selection region 281 is depicted in FIG. 24. Selecting the Associated Series tab 228 causes region 302 to be displayed, which lists one or more time series that are currently associated with the combination event. Selecting a time series from the region 302 causes the selected time series to be displayed as a graph 288 in the display region 282. In the illustrated example, a time series entitled "fatty/north/sausage" has been selected and is displayed as a graph 288 along with the combination event. User input regions 304 and 306 are also included to associate additional time series data with the event and to remove an associated time series, respectively. In addition, a user input region 308 is provided to cause each of the associated time series to be displayed simultaneously in the display region 282.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer display for displaying one or more graphical user interfaces generated by software instructions stored on a computer readable medium, the one or more graphical user interfaces comprising:
   one or more data association input regions for associating a stored event with stored time series data;
   one or more event defining input regions for defining properties of the associated event, the one or more event defining input regions including one or more selectable event types, wherein predefined selectable event types include at least one of a pulse type event, a level shift type event, a ramp type event, or a decay type event, wherein selecting an event type defines a relationship between the time series data and the associated event, and wherein a time series analysis program uses the time series data, the selected event type, and the associated event to generate a forecast using a time series model.

2. The computer display of claim 1, further comprising:
   a display region for displaying the associated event and the time series data.

3. The computer display of claim 2, wherein the display region may be used to graphically define properties of the associated event.

4. The computer display of claim 1. wherein the one or more event defining input regions include a region for inputting a name of the associated event.

5. The computer display of claim 1, wherein the event type may be selected from a list of predefined event types.

6. The computer display of claim 1, wherein the region for inputting an event type includes a field for inputting a user-defined event type.

7. The computer display of claim 6, wherein the one or more event defining input regions includes a region defining a combination event type from a plurality of predefined event types.

8. The computer display of claim 7, wherein the plurality of predefined event types includes two or more of a pulse type event, a level shift type event, a ramp type event, and a decay type event.

9. The computer display of claim 1, wherein the one or more event defining input regions include a region for inputting a starting time of the associated event.

10. The computer display of claim 1, wherein the one or more event defining input regions include a region for inputting a duration of the associated event.

11. The computer display of claim 1, wherein the one or more event defining input regions include a region for defining recurrence of the associated event.

12. The computer display of claim 1, wherein the one or more data association input regions include a region for selecting the stored time series data from a list of available time series.

13. The computer display of claim 1, wherein the one or more data association input regions may be used to associate the event with a plurality of stored time series.

14. The computer display of claim 1, wherein the time series model is used for process control.

15. The computer display of claim 1, further comprising:
   one or more event creating input regions for creating a new event; and
   one or more event storing input regions for storing the new event.

16. A system for generating a forecast using a time series model, comprising:
   computer-executable instructions stored on a computer readable medium for generating one or more graphical user interfaces that are operable to define properties of a stored event and to associate the stored event with stored time series data;
   wherein the properties of the event include one or more selectable event types, wherein predefined selectable event types include at least one of a pulse type event, a level shift type event, a ramp type event, or a decay type event, wherein selecting an event type defines a relationship between the time series data and the associated event; and wherein a time series analysis program stored on the computer readable medium uses the stored time series data, the selected event type, and the associated event to generate a forecast using a time series model.

17. The system of claim 16, wherein the one or more graphical user interfaces include a display region for displaying the associated event and the time series data.

18. The system of claim 17, wherein the display region may be used to graphically define properties of the associated event.

19. The system of claim 16, wherein the one or more graphical user interfaces include a region for inputting a name of the associated event.

20. The system of claim 16, wherein the time series model is used for process control.

21. The system of claim 16, further comprising:
   a data structure stored in a computer readable medium that stores the defined properties of the stored event and information associating the stored event with the stored time series data.

22. The system of claim 16, further comprising:
   computer-executable instructions stored on a computer readable medium for generating one or more graphical user interfaces that are operable to create a new event, and to store the new event.

23. A computer implementented method for generating a forecast using a mathematical model, comprising:
   storing, in memory, time-stamped data in the form of a time series;
   generating one or more graphical user interfaces for displaying the time series, for receiving instructions to define properties of a stored event, and for associating the stored event with the time series;
   wherein the properties of the associated event include one or more selectable event types, wherein predefined selectable event types include at least one of a pulse type event, a level shift type event, a ramp type event, or a decay type event, and wherein selecting an event type defines a relationship between the time series and the associated event; and generating a forecast using the mathematical model based on the time series, the selected event type, and the associated event.

24. The method of claim 23, further comprising:

displaying the associated event and the time series in a common region of the one or more graphical user interfaces.

25. The method of claim 24, further comprising:

defining at least one property of the associated event by graphically manipulating the associated event displayed in the common region.

26. The method of claim 23, further comprising:

generating one or more graphical user interfaces for receiving instructions to create a new event, and to store the new event.

* * * * *

UNITED STATES PATENT AND TRADEMARK OFFICE
CERTIFICATE OF CORRECTION

PATENT NO. : 7,530,025 B2  Page 1 of 1
APPLICATION NO. : 11/124920
DATED : May 5, 2009
INVENTOR(S) : Ramarajan et al.

It is certified that error appears in the above-identified patent and that said Letters Patent is hereby corrected as shown below:

In column 10, line 55, delete "implementented" and insert -- implemented --.

Signed and Sealed this

Ninth Day of June, 2009

JOHN DOLL
*Acting Director of the United States Patent and Trademark Office*